United States Patent [19]
Pollock

[11] Patent Number: 5,645,726
[45] Date of Patent: Jul. 8, 1997

[54] TREATMENT OF WASTE LIQUOR IN A VERTICAL SHAFT BIOREACTOR

[75] Inventor: David C. Pollock, Calgary, Canada

[73] Assignee: Deep Shaft Technology Inc., Galgary, Canada

[21] Appl. No.: 615,436

[22] Filed: Mar. 14, 1996

[51] Int. Cl.⁶ .................................................. C02F 3/20
[52] U.S. Cl. ................... 210/626; 210/629; 210/195.1; 210/221.2
[58] Field of Search ........................... 210/620, 626, 210/629, 195.1, 195.3, 202, 220, 221.2, 258, 259

[56] References Cited

U.S. PATENT DOCUMENTS

| | | | |
|---|---|---|---|
| 4,086,160 | 4/1978 | Roesler | 210/195.1 |
| 4,230,563 | 10/1980 | Roesler | 210/629 |
| 4,253,949 | 3/1981 | Hines et al. | 210/221.2 |
| 4,272,375 | 6/1981 | Pollock | 210/194 |
| 4,272,379 | 6/1981 | Pollock | 210/629 |
| 4,278,546 | 7/1981 | Roesler | 210/429 |
| 4,279,754 | 7/1981 | Pollock | 210/629 |
| 4,287,070 | 9/1981 | Pollock | 210/629 |
| 4,297,217 | 10/1981 | Hines et al. | 210/195.1 |
| 4,304,665 | 12/1981 | Hines | 210/194 |
| 4,308,144 | 12/1981 | Saito | 210/620 |
| 4,338,197 | 7/1982 | Bolton | 210/435 |
| 4,340,484 | 7/1982 | Pollock et al. | 210/607 |
| 4,351,730 | 9/1982 | Bailey et al. | 210/629 |
| 4,367,146 | 1/1983 | Pollock et al. | 210/629 |
| 4,376,707 | 3/1983 | Fujimoto et al. | 210/221.2 |
| 4,407,718 | 10/1983 | Pollock | 210/629 |
| 4,416,781 | 11/1983 | Bailey et al. | 210/629 |

Primary Examiner—Christopher Upton
Attorney, Agent, or Firm—Cushman Darby & Cushman IP Group Pillsbury Madison & Sutro LLP

[57] ABSTRACT

An improved apparatus for treating waste mixed liquor comprising a long vertical downcomer chamber; an adjacent long vertical riser chamber; a surface basin; said downcomer chamber and said riser chamber operatively communicating directly with each other at their lower ends and through said basin at their upper ends to form a circulatory loop; means for injecting an oxygen-containing gas in said downcomer and riser chambers at depth; a flotation-sedimentation vessel adjacent said surface basin; a first waste liquor influent conduit opening into said riser chamber at depth and operatively communicating with said vessel to provide a first waste liquor influent from said vessel to said riser chamber; a treated liquor effluent first conduit opening into said riser chamber and operatively in communication with said vessel to provide a treated waste liquor first effluent to said vessel from said riser chamber; the improvement comprising a treated waste liquor effluent second conduit having an inlet opening into said surface basin and operatively in communication with said vessel to provide a treated waste liquor second effluent to said vessel from said surface basin; and flow control and mixing means to operatively provide said treated waste liquor first and second effluents in such intimate mixing of said first and said second effluents as to cause heterogeneous bubble nucleation thereof and produce a nucleated liquor. The apparatus provides for improved flocculation, flotation and settlement of solids.

17 Claims, 14 Drawing Sheets

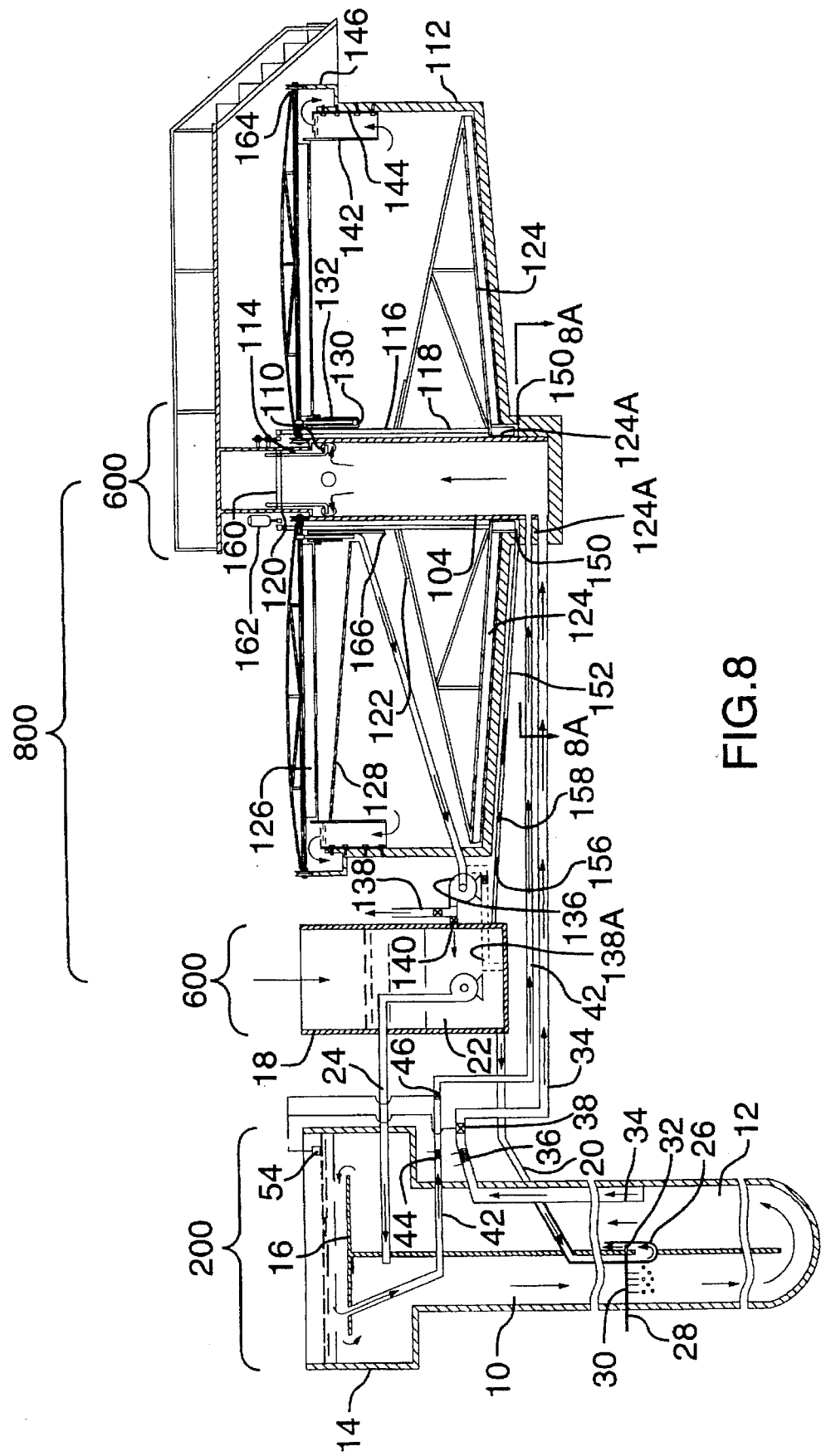

TREATMENT OF WASTE LIQUOR IN A VERTICAL SHAFT BIOREACTOR

FIELD OF THE INVENTION

This invention relates to a method and apparatus for treating waste water and more particularly to said treatment by means of a deep vertical bioreactor system.

BACKGROUND TO THE INVENTION

Long deep vertical bioreactor systems suitable for the treatment of waste water by activated sludge processes are known and disclosed as for example, in U.S. Pat. No. 4,279,754 to Pollock.

A deep vertical bioreactor reactor system for the treatment of waste water, typically, comprises a bioreactor, a solid/liquid separator and intervening apparatus in communication with the bioreactor and separator. As fully described in aforesaid U.S. Pat. No. 4,279,754 such bioreactors essentially comprise a circulatory system which includes at least two substantially vertical side-by-side chambers in communication with each other at their upper and lower ends, with their upper ends being connected through a basin. The waste water for treatment is caused to circulate repeatedly through and between the downflow chamber (the downcomer) and the upflow chamber (the riser). Normally, the waste-containing liquor, referred to as mixed liquor, is driven through the circulating system injection of an oxyen-containing gas, usually air, into one or both of the chambers. Typically, in a 500 feet deep reactor air injection is at a depth of about 200 feet with the air at a pressure of 100 pounds per square inch. At start-up of the bioreactor a mixture of air and influent waste water is injected into the riser in the nature of an air lift pump. However, once circulation of the liquor begins, air injection can be also into the downcomer. The fluid in the downcomer having a higher density than the liquid-bubble mixture of the riser, thereby provides a sufficient lifting force to maintain circulation. Usually the basin is fitted with a baffle to force mixed liquor at the maintain circulation. Usually the basin is fitted with a baffle to force mixed liquor at the top of the riser to traverse a major part of the basin releasing spent gas before again descending the downcomer for further treatment.

Influent waste water is introduced at depth into the riser chamber through an upwardly directed outlet arm of an influent conduit. An oxygen-containing gas, usually air, is injected into the influent liquor in the outlet arm of the influent liquor conduit. In addition to oxygenating the waste liquor, the injected gas acts to create an air lift pump which draws the influent waste into the bioreactor riser. Effluent liquor is withdrawn from the riser through an effluent liquor conduit having its inlet located in the riser at a point below the outlet of the influent liquor conduit. During operation of the bioreactor the flow of influent liquor to and effluent liquor from the bioreactor are controlled in response to changes in level of liquid in the connecting upper basin.

The injected oxygen-containing gas dissolves in the mixed liquor as the liquor descends in the downcomer to regions of greater hydrostatic pressure. This dissolved oxygen constitutes the principal reactant in the biochemical degradation of the waste. As the circulating mixed liquor ascends in the riser to regions of lower hydrostatic pressure the dissolved gas separates and forms bubbles. When the liquid/bubble mixture from the riser enters the basin, gas disengagement occurs.

Reaction between waste, dissolved oxygen, nutrients and biomass substantially takes place during circulation through the downcomer, riser and basin bioreactor system. The products of the reaction are carbon dioxide, and additional biomass which in combination with unreacted solid material present in the influent waste water forms a sludge.

The term "Waste water" as used herein is understood to include water carrying any type of biodegradable domestic and industrial waste materials, for example, normal domestic waste and the effluents produced by farms, food factories, refineries, pulp mills, breweries and other industries. By "mixed liquor" is meant the mixture of liquids and solids present in the bioreactor system.

The term "dispersed gas bubbles" or "dispersed gas" in this application is quantitatively defined as the volume of gas in mL per litre of liquor that will spontaneously evolve from a sample of mixed liquor taken from a long shaft bioreactor when the sample is allowed to stand undisturbed for one minute. The term "dissolved gas" is quantitatively defined in this application as the volume of gas in mL per litre of liquor that will evolve from a sample of mixed liquor taken from a long shaft bioreactor after the sample has stood undisturbed for one minute and is then stirred under specific conditions for up to ten minutes minus the volume of dispersed gas that evolved after the first minute.

The measurement of the two types of gas may be done on a test rig provided for the purpose, as hereinafter described.

Effluent liquor withdrawn from the bioreactor comprises a mixture of liquid and solids commonly called sludge. Before the treated liquid component can be discharged into a natural water course, the solids component, i.e. sludge, must be separated. Separation is commonly carried out in a separation vessel by a combination of flotation and sedimentation. The gas bubbles which cause the solid particles in the mixed liquor to float to the liquid surface in the flotation vessel originate from the oxygen-containing gas which is dissolved in the mixed liquor as it circulates through the bioreactor. This dissolved gas comes out of solution in the form of bubbles as the mixed liquor rises to levels of lower hydrostatic pressure. Thus, when the effluent liquor stream reaches the surface it will contain dispersed gas bubbles which have already come out of solution, as well as dissolved gas remaining in the liquor, which is thus in a supersaturated state. Effective flotation of the solids in the sludge required that a brief period of about 1–4 minutes of gentle mixing of the sludge be provided to allow the particles to flocculate and form larger but more fragile agglomerates. The flocculated agglomerated particles are mixed with a stream of liquid containing supersaturated dissolved gas, which gas at the reduced pressure of the separation vessel spontaneously nucleates and generates micro-bubbles of gas to enhance flotation of the sludge flocculated particles. Balancing the conditions to obtain good flocculation against the requirements to provide microbubbles from the dissolved gas as quite difficult and at best a compromise in operating conditions. In practice, the addition of expensive flocculating agents such as cationic polymer is used to strengthen and maintain the floc integrity under the more turbulent conditions required for dissolved gas micro-bubble generation.

Energy levels are, generally, quantitatively defined by the concept of velocity gradients "G" expressed in $sec^{-1}$ and is a measure of mixing intensity. Formulas are given in standard text books on waste water treatment e.g. . . . "Flocculation" is defined as the natural tendency for colliding particles to stick together to form agglomerates. Healthy biological solid particles have adhesive-like surface coating which increases the mechanical strength of the formed flocculant agglomerate.

During flocculation the destabilized particles grow and agglomerate to form large, settleable flocs. Through gentle prolonged mixing, chemical bridging, physical enmeshment of particles, or both occur. Flocculation is slower and more dependent on time and agitation than in a rapid mix step, such as seen in the bioreactor.

Energy levels for optimum flocculation of biosolid is generally around 100 $sec^{-1}$. The addition of synthetic polymers to the mixed liquor may allow the floc to survive energy levels of 100–200 $sec^{-1}$.

There is need for an improved bioreactor-separation apparatus and process which reduces the amount of flocculating agents necessary to provide good flocculation while providing improved dissolved gas micro-bubble generation.

SUMMARY OF THE INVENTION

It is an object of the present invention to provide an improved waste water treatment bioreactor and separation process and system for the treatment of waste water which reduces the amount of flocculating additives required.

It is further object of the invention to provide a bioreactor process and system having means for producing enhanced dissolved gas micro-bubble generation to facilitate flocculation.

Unexpectedly, I have found that the relatively small bubbles of dispersed gas have surprising value in causing heterogeneous bubble nucleation to effect better flocculation and floatation and facilitate separation of the solids from the liquid.

Heterogeneous Bubble Nucleation occurs when sufficient amounts of micro-bubbles or dispersed gas bubbles are introduced into a supersaturated solution of dissolved gas to provide nuclei on which the dissolved gas can come out of solution. Such production of gas bubbles by means of heterogeneous bubble nucleation is termed gas generation.

The phenomena of heterogeneous bubble nucleation is known and practiced by almost all of the current suppliers of dissolved air flotation processes. Most flotation units employ a "let down" zone in the influent stream to the flotation tank in order to initiate bubble nucleation. This can be done by creating a pressure drop across an orifice, usually several atmospheres in magnitude, or by using bubble shear devices such as submerged rotating disks or cavitation impellers. There is always a substantial amount of energy involved in this process and more importantly, damage to the biomass may occur. This, however, is not the case in the context of the present invention.

The term "heterogeneous bubble nucleation" as used in this specification means the production of gas micro-bubbles from dissolved gas substantially by the nucleation of the dissolved gas by the action of admixed dispersed gas bubbles.

I have surprisingly found that heterogeneous bubble nucleation can be conveniently established in a bioreactor-flotation process without any additional energy expenditure by simply providing a mixing 7-one, preferably a distinct chamber, to allow separately provided substantially dispersed gas and dissolved gas to mix at energy levels appropriate for gas precipitation and bioflocculation.

Thus, contrary to the teachings of the aforesaid prior art, I have found that in consequence of enhanced heterogeneous bubble nucleation produced according to the present invention the generation of enhanced volumes of gas in the form of micro-bubbles in the system enhances flocculation.

Accordingly, in one aspect the invention provides an improved apparatus for treating waste mixed liquor comprising a long vertical downcomer chamber; an adjacent long vertical riser chamber; a surface basin; said downcomer chamber and said riser chamber operatively communicating directly with each other at their lower ends and through said basin at their upper ends to form a circulatory loop; means for injecting an oxygen-containing gas in said downcomer and riser chambers at depth; a flotation-sedimentation vessel adjacent said surface basin; a first waste liquor influent conduit opening into said riser chamber at depth and operatively communicating with said vessel to provide a first waste liquor influent from said vessel to said riser chamber; a treated liquor effluent first conduit opening into said riser chamber and operatively in communication with said vessel to provide a treated waste liquor first effluent to said vessel from said riser chamber; the improvement comprising a treated waste liquor effluent second conduit having an inlet opening into said surface basin and operatively in communication with said vessel to provide a treated waste liquor second effluent to said vessel from said surface basin, and flow control and mixing means to operatively provide said treated water liquor first and second effluents in such intimate mixing of said first and said second effluents as to cause heterogeneous bubble nucleation thereof and produce a nucleated liquor.

One aspect of the present invention is to preferably provide a mixing chamber wherein two streams of mixed liquor, one containing a predominance, preferably, a maximum of dissolved gas and the other containing a predominance, preferably, a maximum of dispersed gas; each drawn from separate riser channels and preferably operating at different velocities and energy levels are mixed in suitable proportions to create a single mixing energy consistent with the requirements of heterogeneous bubble nucleation, gas generation and bio-flocculation. More preferably, two adjustable recycle streams, one through the flotation/separation vessel and one through an overflow weir in the mixing chamber can be varied to change the hydraulic residence time in the feed conduits and mixing chambers.

Thus, the invention provides a method and apparatus for the three phase separation of solid, liquid and gasses contained in the mixed liquor circulating in a long vertical shaft bioreactor and discharging to a solids separation device, wherein the flotation of flocculated biosolids is achieved by bubble attachment to, or inclusion in, the solid particle or in the agglomerate of solid particles. The improvement preferably comprises at least two effluent feed conduits from the bioreactor, one operating at a lower energy level and the other at higher energy level and directing flow to a mixing chamber adjacent to the solids separation vessel. In the mixing chamber the dispersed gas bubbles prevalent in the low energy effluent conduit are used to gently mix and flocculate the biosolids, aided by the natural physical polymeric characteristics of healthy microbes and, optionally, by the addition of synthetic polymers or flocculants. The mixing chamber allows the simultaneously heterogeneous bubble nucleation and generation of a much greater quantity of dissolved gas prevalent in the high energy effluent conduit. The effluent streams are regulated by flow control valves and mixed in a wide range of proportions so as to cause simultaneous flocculation and gas generation for optimum solids separation in the separation vessel. The chamber is, optionally, fitted with an adjustable overflow recycle weir discharging to an influent intermediate reservoir to allow the hydraulic residence time in the chamber and feed conduits to be varied to prevent stagnation or premature gas generation.

In a more preferred aspect, the invention provides an improved apparatus for treating waste mixed liquor comprising a long vertical downcomer chamber, an adjacent long vertical riser chamber, a surface basin, the downcomer and riser chambers operatively communicating directly with each other at their lower ends and through the basin at their upper ends to form a circulatory loop, the downcomer and riser chambers having means for the injection therein at depth of an oxygen-containing gas, a waste influent first conduit operatively opening into said riser chamber at a location above the location of said means for injecting oxygen-containing gas into said influent conduit, a treated waste effluent first conduit operatively discharging from said riser chamber at a location below the location of the opening of said influent conduit into said riser chamber, the improvement comprising a waste influent second conduit operatively connected within said surface basin adjacent the top of said downcomer chamber, a flotation/sedimentation vessel, a mixing chamber in communication with said waste influent first and second conduits and said vessel, to receive first and second effluent flows through said effluent first and second conduits, respectively, flow control and metering devices on each of said first and said second effluent conduits, said first and second flow control devices operatively connected to a liquid level sensor at the liquid surface of said surface basin, an overflow weir operatively connected to said influent first and second conduits, said mixing chamber having a mixed waste effluent orifice operatively in communication with said vessel at a position below the normal surface level of liquid in said vessel, a sludge-receiving trough in contact with an upper edge of said vessel at a position above said mixed waste effluent orifice, a reservoir in communication with said mixing chamber overflow weir to receive influent and waste liquid flows therefrom.

Thus, the above described disadvantages of the prior art have been substantially reduced in the improved method and apparatus according to the invention.

In a preferred embodiment a mixing chamber is located between the long vertical shaft bioreactor and the solids/liquid separator device. In effect, the mixing chamber receives mixed liquor flow from the depth of the bioreactor riser chamber and from the surface basin of the bioreactor in controlled quantities and flow velocities to effect simultaneous flocculation and heterogeneous bubble generation. The mixing chamber also forms part of the recycle loop to the bioreactor system and thus provides control of the residence time in the chamber and conduits.

In this specification energy levels sufficient for heterogeneous bubble nucleation are quantitatively similar to the energy levels required to intimate dissolved gas generation by stirring under the aforesaid conditions described in the definition of dissolved gas. Heterogeneous bubble nucleation can occur at 100 to 200 $sec^{-1}$, which is within the range of energy levels required for bioflocculation. In contrast, homogenous bubble nucleation occurs when dissolved gas creates micro bubbles in the absence of sufficient quantities of dispersed gas bubbles or other nucleating sites to cause heterogeneous bubble nucleation. Energy levels for homogeneous bubble nucleation are 200 $sec^{-1}$ and higher, which is substantially above the energy level for heterogeneous bubble nucleation and well above natural flocculation energy levels for biological particles. Thus, the present invention provides an improved system for heterogeneous bubble nucleation to provide enhanced criteria for flocculation.

The present invention utilizes the discovery, contrary to the teachings of the prior art, that small bubbles of dispersed gas have surprising value in causing heterogeneous bubble nucleation, to effect better flocculation, and thus better flotation for enhanced separation of solid from liquids. The invention utilizes the addition of waste liquor containing essentially dissolved gas with waste liquor containing essentially dispersed gas. The liquor containing the dispersed gas effects nucleation of the dissolved gas in the other liquor, which causes the precipitation of a greater volume of gas as bubbles to assist flocculation and flotation.

Bubble nucleation should ideally be started during or subsequent to the flocculation of the biomass. Large bubbles are generally of little value to flotation since they disrupt the floating sludge blanket and cause sludge blanket break-up. I have discovered that dispersed gas bubbles are important in providing flocculating energy and in nucleating dissolved gas. Very small bubbles are generally also of little value since they tend to flow the fluid flow and carry pinpoint floc to the end of the flotation tank and into the effluent. I have found that it is preferable to remove as much dissolved gas from the liquid as possible and to size the bubbles so that flotation is not impaired. I have observed that supersaturation values of dissolved oxygen, and by implication dissolved air, exist as much as two hours after entry to the flotation tank. Without nucleation energy being available, some dissolved gas does not come out of solution. A test rig as hereinafter described was used to nucleate and generate gas bubbles from the effluent with ultrasonic energy after all spontaneous precipitation of gas had stopped.

In a further aspect, the invention provides an improved activated sludge waste treatment process wherein an aerobic biological reaction takes place during the continuous circulation of a waste liquor in an apparatus including a surface basin, a long vertical downcomer chamber, a long vertical riser chamber operatively communicating with the downcomer through the basin and at the lower end of the downcomer to form a loop, and including means to introduce influent waste liquor at depth into said riser and to discharge effluent waste liquor at depth from said riser at a location lower in said riser than the point of influent introduction and including means to circulate waste liquor through said riser and downcomer in the presence of oxygen-containing gas, the improvement comprising discharging a second effluent waste liquor from said surface basin adjacent said discharged effluent waste liquor to effect intimate mixing of said first and said second effluent liquors whereby to cause heterogeneous bubble nucleation.

Thus, the invention provides in one aspect a process for effecting heterogeneous bubble nucleation in a waste mixed liquor of a bioreactor treatment system having:

a) a deep vertical bioreactor having an upper zone and a lower zone;
    b) a solids flotation/separation vessel;
    c) a source of first mixed liquor; and
    d) a source of second mixed liquor; said process comprising admixing said first liquor with said second liquor to effect said nucleation to provide an admixed substantially denucleated effluent liquor.

The first liquor is admixed with the second liquor in the solids flotation/separation vessel or in a distinct bubble generation chamber in communication with the solids flotation/separation vessels to receive the denucleated effluent stream.

The apparatus and process of the invention is of use when the active cells of the biomass can incorporate nitrogen gas within the cell membrane to aid in flotation.

BRIEF DESCRIPTION OF THE DRAWINGS

In order that the invention may be better understood, a preferred embodiment will now be described by way of example only, with reference to the accompanying drawings, wherein:

FIG. 8 is a diagrammatic vertical section of an alternative embodiment of FIG. 7 of a circular flotation-sedimentation vessel and influent reservoir; and wherein the same numerals denote like parts.

DETAILED DESCRIPTION OF A PREFERRED EMBODIMENT

Figure 1:
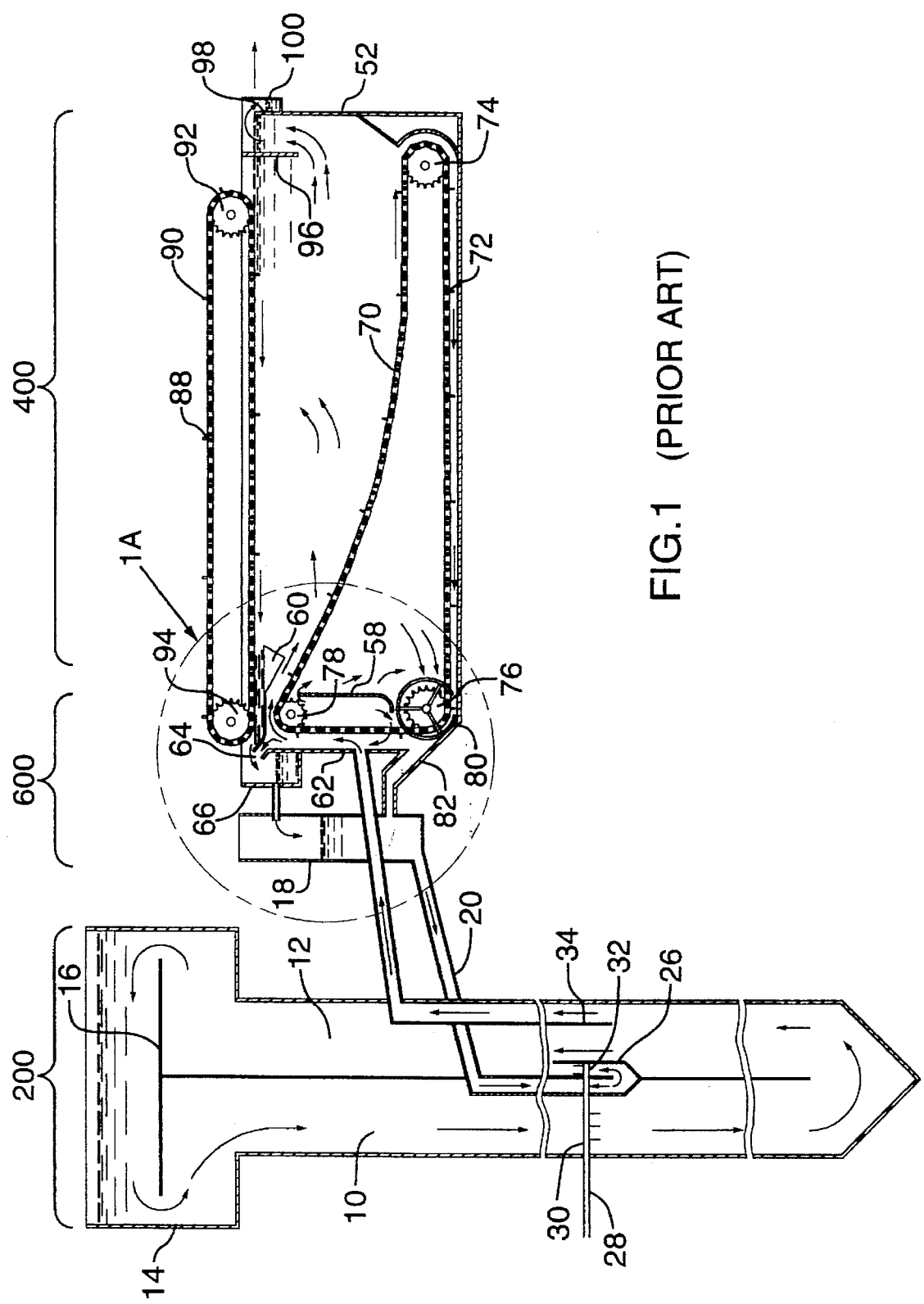
FIG. 1 is a diagrammatic vertical section of a prior art long vertical shaft bioreactor and a connected flotation-sediment vessel.
Figure 1A:
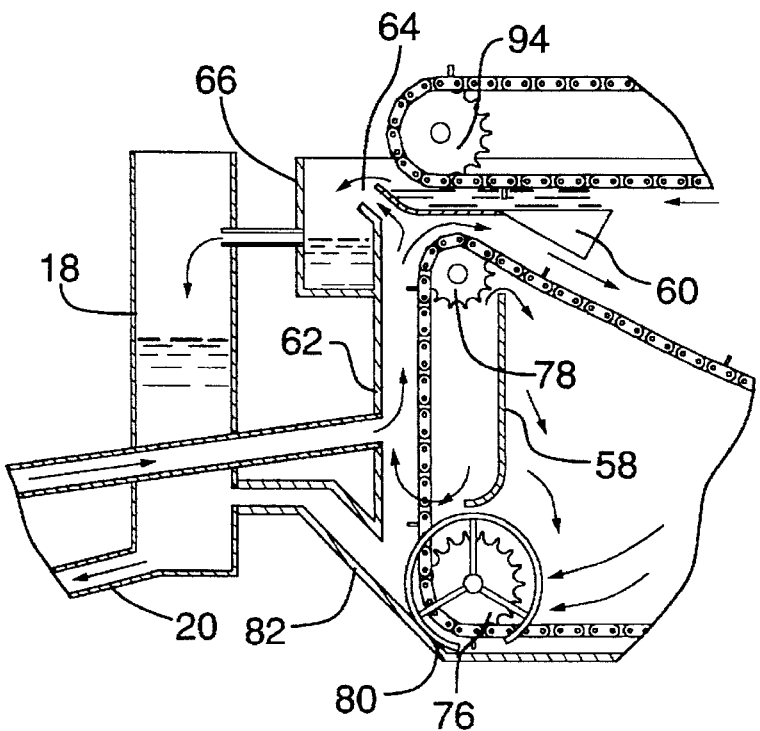
FIG. 1A is an enlarged fragmentary view of the section shown in FIG. 1.

With reference now to the drawings, FIG. 1 shows a bioreactor system for the treatment of waste water comprising a bioreactor, shown generally as 200, a solids/liquid apparatus shown generally as 400 and communicating apparatus shown generally as 600, linking bioreactor 200 and enlarged under FIG. 1A.

With reference to FIG. 1, FIG. 1A, FIG. 2 and FIG. 3, flotation-sedimentation apparatus and system 400 of the prior art drawing is essentially the same as apparatus and system 400 of the present invention;

Bioreactor 200 has a significant number of common features as between the prior art and invention embodiments; whereas linking apparatus 600 of use in the present invention embodiment is significantly different from the prior art embodiment.

Figure 2A:
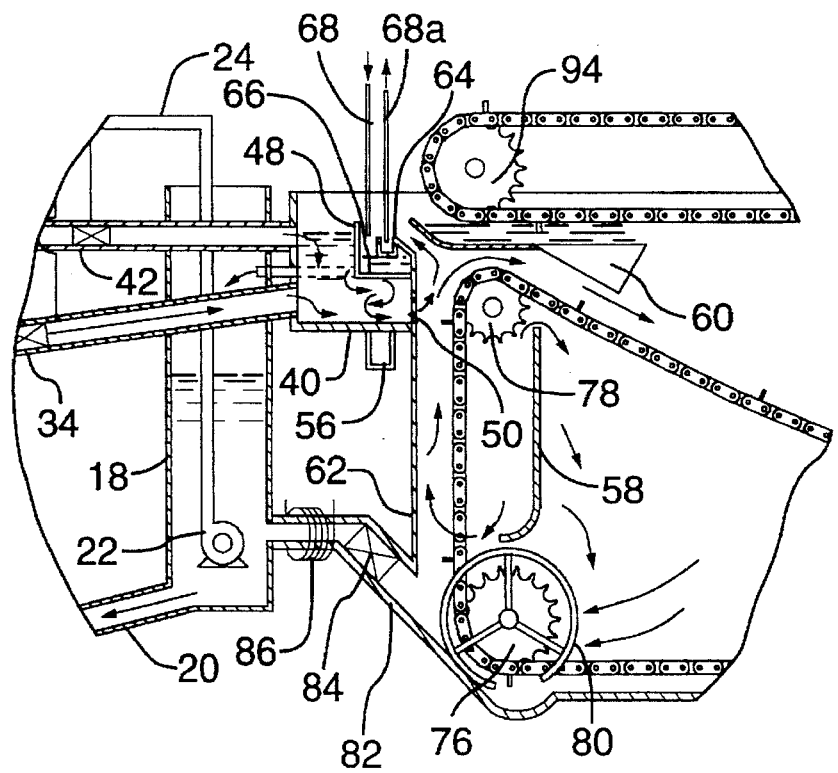
FIG. 2A is an enlarged fragmentary view of the section shown in FIG. 2.
Figure 2:
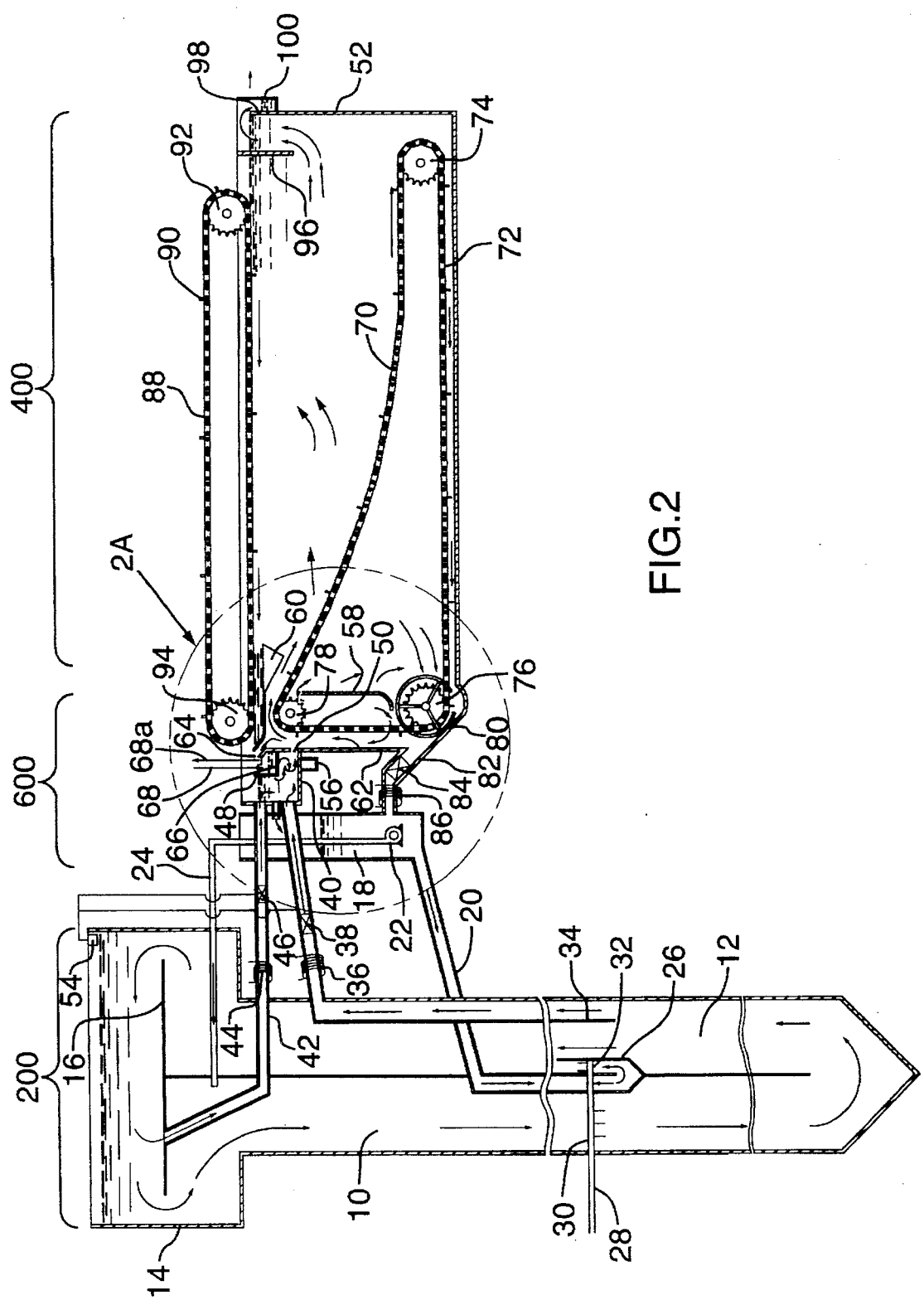
FIG. 2 is a diagrammatic vertical section through a long vertical shaft bioreactor, mixing chamber, influent reservoir and flotation-sedimentation vessel according to the invention.

With specific reference now to FIG. 2 and FIG. 2A, this embodiment of the invention has a downcomer chamber 10 and a riser chamber 12. Downcomer 10 and riser 12 are connected together directly at their lower ends and connected through a surface basin 14 at their upper ends. Downcomer 10, riser 12 and basin 14 thus form a circulating loop. Basin 14 is fitted with baffle 16 which directs the flow of circulating mixed liquor across the breadth of basin 14. Waste water is introduced into riser chamber 12 from reservoir 18 which discharges into waste influent conduit 20 and, under certain conditions of high flow, also by pump 22 into conduit 24. Conduit 20 discharges into riser chamber 12 through upturned U-shaped arm 26 and conduit 24 discharges into the circulating mixed liquor in basin 14 near the top of chamber 10. Pressurized oxygen-containing gas, usually air, through conduit 28, is injected into the downcomer through sparger 30 and into the upturned arm 26 of influent conduit 20 by sparger 32. Sparger 32 serves to oxygenate the influent and recycle streams in conduit 20 and to act as an air lift pump drawing influent waste water into riser 12. Sparger 32 also provides air for the air/liquid mixture in chamber 12 required to circulate the mixed liquor. Waste water contained in the mixed liquor is biochemically degraded as it circulates through bioreactor 200. Effluent is drawn from riser 12 through waste effluent conduit 34 which has its inlet positioned below the point of discharge of upturned arm 26 into riser 12. Effluent passes from conduit 34 through flow meter 36 and flow control valve 38 to a flocculation and gas micro-bubble generation mixing chamber 40, Effluent is also drawn through surface conduit 42 from basin 14 at a point upstream of the inlet of conduit 24 and passes through flow meter 44 and flow control valve 46 to chamber 40.

Mixed liquid fed into mixing chamber 40 from conduit 42 containing substantially dispersed gas effects heterogeneous bubble nucleation of the dissolved gas in the mixed liquor fed from conduit 34 into mixing chamber 40. Thus, intimate admixture of these two mixed liquors in mixing chamber 40 causes the unexpected generation of a greater volume of gas in the form of bubbles to assist in beneficial flocculation and flotation process.

Chamber 40 is fitted with moveable overflow control weir 48 and a fixed submerged orifice 50 operatively connected to a flotation/sedimentation vessel 52. Flow control valves 46 and 38 are adjustable in order to provide an optimum proportioning of effluent flows from surface conduit 42 and water effluent conduit 34. Together valves 46 and 38 are controlled electronically by liquid level indicators in basin 14 or by mechanical means operated by float 54. Flow meters 44 and 36 provide a means of measuring flow in conduit 42 and 34, respectively. Thus valves 38 and 46 and flow meters 44 and 36 control mixing means. The hydraulic residence time in chamber 40 is controlled by regulating the flow rate out through orifice 50 and overflow rate of weir 48. An inlet 56 provides a means for optionally injecting flocculating chemicals or pH adjustment. Pressurized air conduit 28 also connects with inlet means 56 whereby periodic operation through inlet means of high pressure air prevents solids build up in orifice 50.

Thus, the relative amounts and velocity gradients of the respective mixed liquors fed from conduits 34 and 42 may be readily suitably controlled to effect optimization of heterogeneous bubble nucleation.

When the admixed and denucleated effluent stream enters flotation/sedimentation vessel 52 through orifice 50 it is directed upwards by dispersion plate 58 into the generally V-shaped semi-enclosure generally defined by the sloping underside of a triangular shaped wave baffle 60 and end wall 62 of vessel 52. This semi-enclosure terminates at its upper narrow extremity to provide an orifice 64. Thus, dispersed gas bubbles entering the enclosure through orifice 50 will pass out through orifice 64 to sludge trough 66 carrying with them some of the effluent mixed liquor. Trough 66 in turn discharges into reservoir 18. Waste effluent enters the system at feed line 68 and effluent sludge is wasted through off-line 68A.

Solids falling to the bottom of vessel 52 are carried to the end of vessel 52 by a submerged bottom scraper comprising endless chain belt 70 carrying thereon a series of scraper elements 72. Chain belt 70 passes over sprockets, 74, 76 and 78, of which sprocket 78 is motor driven. Mounted on the same shaft as sprocket 76 is a rotating plough screw 80.

Rotating screw 80 functions to force solids from the bottom of vessel 52 through bottom recycle conduit 82 into reservoir 18. Flow control valve 84 and flow meter 86 are fitted to conduit 82. The rising scraper elements 72 of the bottom scraper serve to stir the effluent as it enters vessel 52 from orifice 50, assisting in the dissolution of residual dissolved gas. Scraper elements 72 travel in close proximity to the inlet of orifice 50, outlet to conduit 82 and outlet to orifice 64 preventing build up of solids and possible blockage. Dispersion plate 58 may be fitted with ultrasonic means (not shown) to further aid in the dissolution of gas dissolved in the effluent.

The vast majority of the small gas bubbles coming out of solution and contained in the admixed denucleated liquor are not directed towards orifice 64 but instead follow the hydraulic flow to the central section of vessel 52 where they act to float solids to the surface. The floating solids are skimmed off the surface of the liquid in vessel 52 into sludge trough 66 by a top skimmer comprising endless chain belt 88 carrying skimmer elements 90. Chain belt 88 passes over sprockets 92 and 94. Sprocket 94 is motor driven. The top of wave baffle 60 serves as a beach for the skimmer elements 90. Effluent free from sludge passes under vertical baffle 96 and over weir plate 98 to effluent trough 100. From trough 100 the treated effluent, free from solids, may be discharged into natural water courses.

In operation, recycle conduit 82 in combination with reservoir 18 functions to control the waste water influent flow to bioreactor 200. As the flow of influent waste water to reservoir 18 increases, the head of liquid in reservoir 18 rises, increasing the back pressure against the flow from recycle conduit 82 and increasing the inlet pressure of conduit 20. Thus, flow of recycle liquor from flotation/sedimentation vessel 52 to reservoir 18 is reduced while the flow to waste influent conduit 20 is increased. Similarly, a reduction in flow of influent waste to reservoir 18 results in an increase in recycle flow through conduit 82 and a decrease in flow to waste influent conduit 20. In cases of extreme hydraulic flows it is more economic to operate pump 22 to augment influent flow through conduit 24 into the bioreactor and maintain correct levels in reservoir 18.

Effluent from waste effluent conduit 34 is thus mixed with effluent from surface conduit 42 in micro-bubble generation mixing chamber 40. I have discovered that mixed liquor ascending from depth through conduit 34 from chamber 12 at a rate of about 2.5 ft./sec. will essentially contain a maximum of dispersed gas bubbles, while at greater than 5 ft./sec. it will essentially contain a maximum of dissolved gas. I have also discovered that only about one third to one half as much energy is required to generate as bubbles the large quantity of dissolved gas contained in the mixed liquor in conduit 34 if mixed in a ratio of approximately 1:3 to 1:2 volumes of mixed liquor containing predominately dispersed gas from surface conduit 42 to the total volume. Further, I have also discovered that generating bubbles from the dissolved gas of conduit 34 by mixing dispersed gas of conduit 42 proceeds at energy levels low enough to enhance simultaneous bioflocculation. Flow control valves 38 and 46 allow a wide range of proportioning of the mixed liquor containing primarily dissolved gas from conduit 34 and mixed liquor containing primarily dispersed gas from conduit 42 to enter chamber 40. As flow into the overall system increases or decreases, flow control valves 46 and 38 may operate together or separately to maintain a preset liquid level in basin 14. The hydraulic residence time of fluid in conduit 34, conduit 42, and chamber 40 can be adjusted by increasing or decreasing recycle flow through overflow weir 48 and submerged orifice 50.

The dissolved gas evolved, due to the bioreaction, contains a significant percentage of carbon dioxide and therefore the total quantity of gas available for flotation is pH dependent. A flocculating agent such as alum or ferric chloride may be injected at inlet 56 to lower the pH, to promote release of dissolved $CO_2$ gas.

Effluent from chamber 40 passes through orifice 50 into flotation/sedimentation vessel 52 into a gentle mixing zone bordered by end wall 62, dispersion plate 58 and wave baffle 60. Mixing is assisted by the motion of scraper elements 72 and dispersed gas bubbles entering from orifice 50 and leaving by orifice 64.

While not being bound by theory, it is believed that a recycling of mixed liquor entering flotation/sedimentation vessel 52 takes place following a circular path up and around dispersion plate 58, under baffle 60 and down and around rotating plough screw 80 following in general the upward direction of the bottom scraper elements 72, as shown in FIG. 2. This recycling tends to fractionate the dispersed gas bubbles according to bubble size. As mentioned hereinbefore some bubbles, particularly the larger gas bubbles rise immediately and are ejected through orifice 64. However, smaller bubbles tend to pass under baffle 60 and float to the surface in vessel 52. Minute bubbles tend to follow the liquid flow and circulate around dispersion plate 58. The recycle directions affect the operation of flotation/sedimentation vessel 52 in two ways. They reduce the fraction of dispersed gas bubbles in the mixed liquor in the influent zone of vessel 52, since the recycle stream has a lower fraction of dispersed bubbles than the effluent entering vessel 52 and also reduce the equivalent concentration of mixed liquor entering flotation/sedimentation vessel 52. The recycle of sedimented sludge and accompanying liquid by rotating plough screw 80 from the bottom of flotation/sedimentation vessel 52 to reservoir 18 serves to control the flow of influent to the bioreactor. If the influent waste flow to reservoir 18 increases, the height of liquid in reservoir 18 increases causing increased back pressure against the recycle from the bottom of flotation/sedimentation vessel 52. In the preferred embodiment shown in FIG. 2, chamber 40 is constructed so as to provide a hydraulic residence time of 1 to 4 minutes and the stilling zone at the end of flotation/sedimentation vessel 52 is typically two to three times greater than the residence time in chamber 40.

Figure 3:
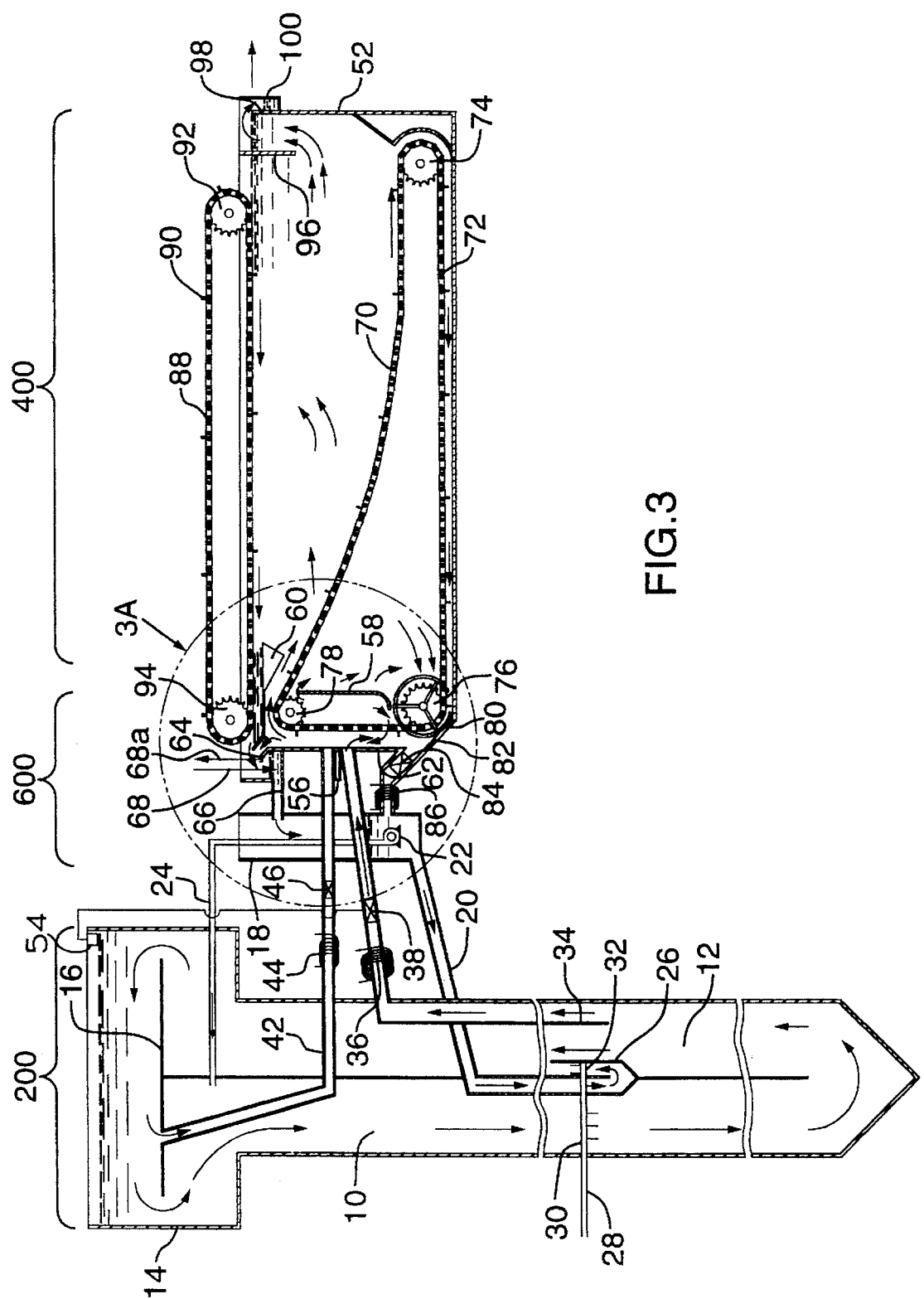
FIG. 3 is an diagrammatic vertical section through a long vertical shaft bioreactor, influent reservoir and flotation-sedimentation vessel; without a mixing chamber of an alternative embodiment according to the invention.
Figure 3A:
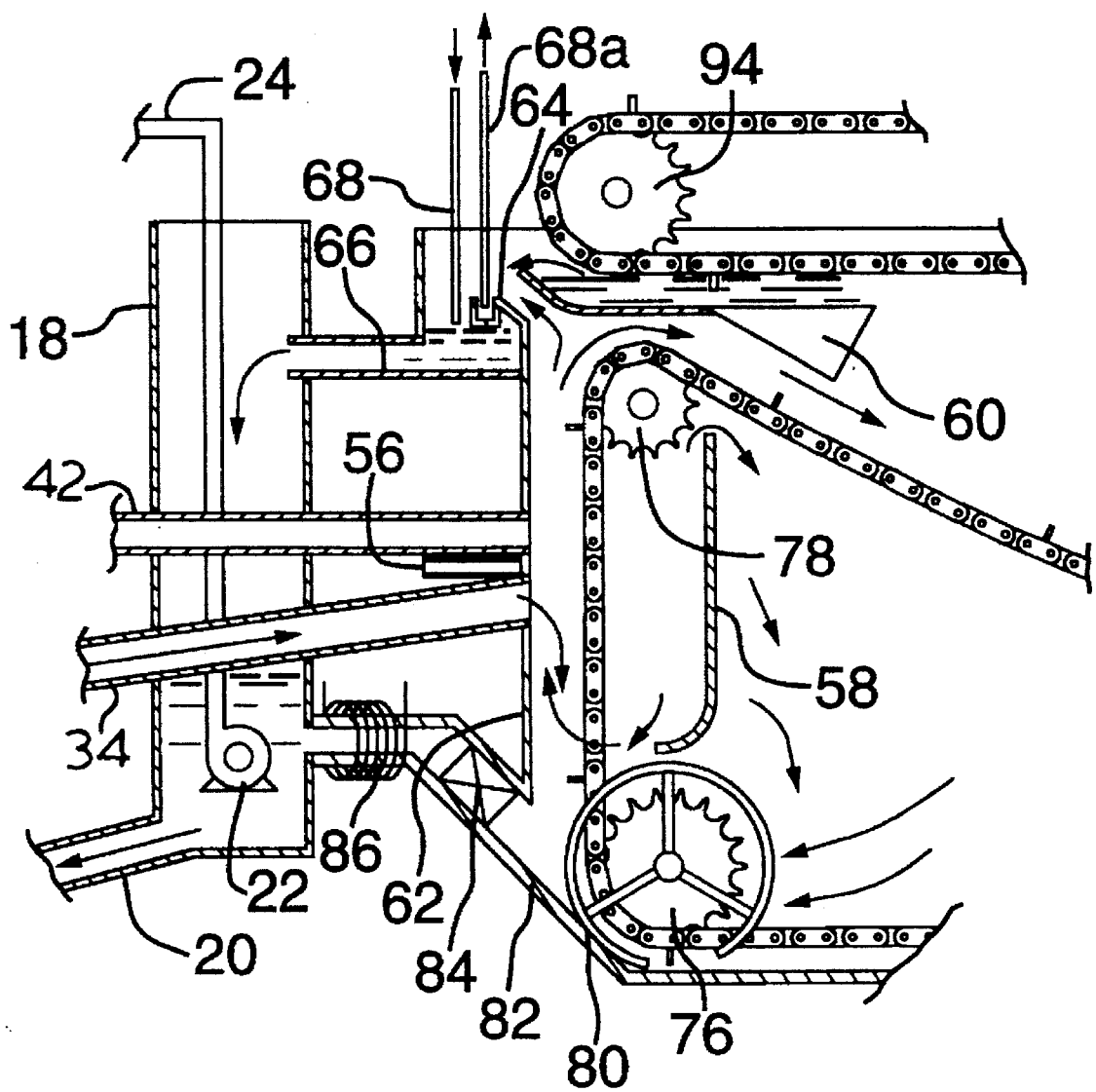
FIG. 3A is an enlarged fragmentary view of the section shown in FIG. 3.

FIG. 3 shows an alternative preferred embodiment not having a distinct mixing chamber 40 as present in the embodiment shown in FIG. 2. Conduits 34 and 42 feed directly to vessel 52 such that intimate contact between the respective liquor fed by conduit 34 effects nucleation of the dissolved gas of liquid fed by conduit 42 to assist the flocculation and flotation process. Thus, conduits 34 and 42 have respective outlets to vessel 52 that are preferably so disposed, one outlet relative to the other, preferably, adjacent, as to effect intimate mixing of the respective liquors.

Figure 7:
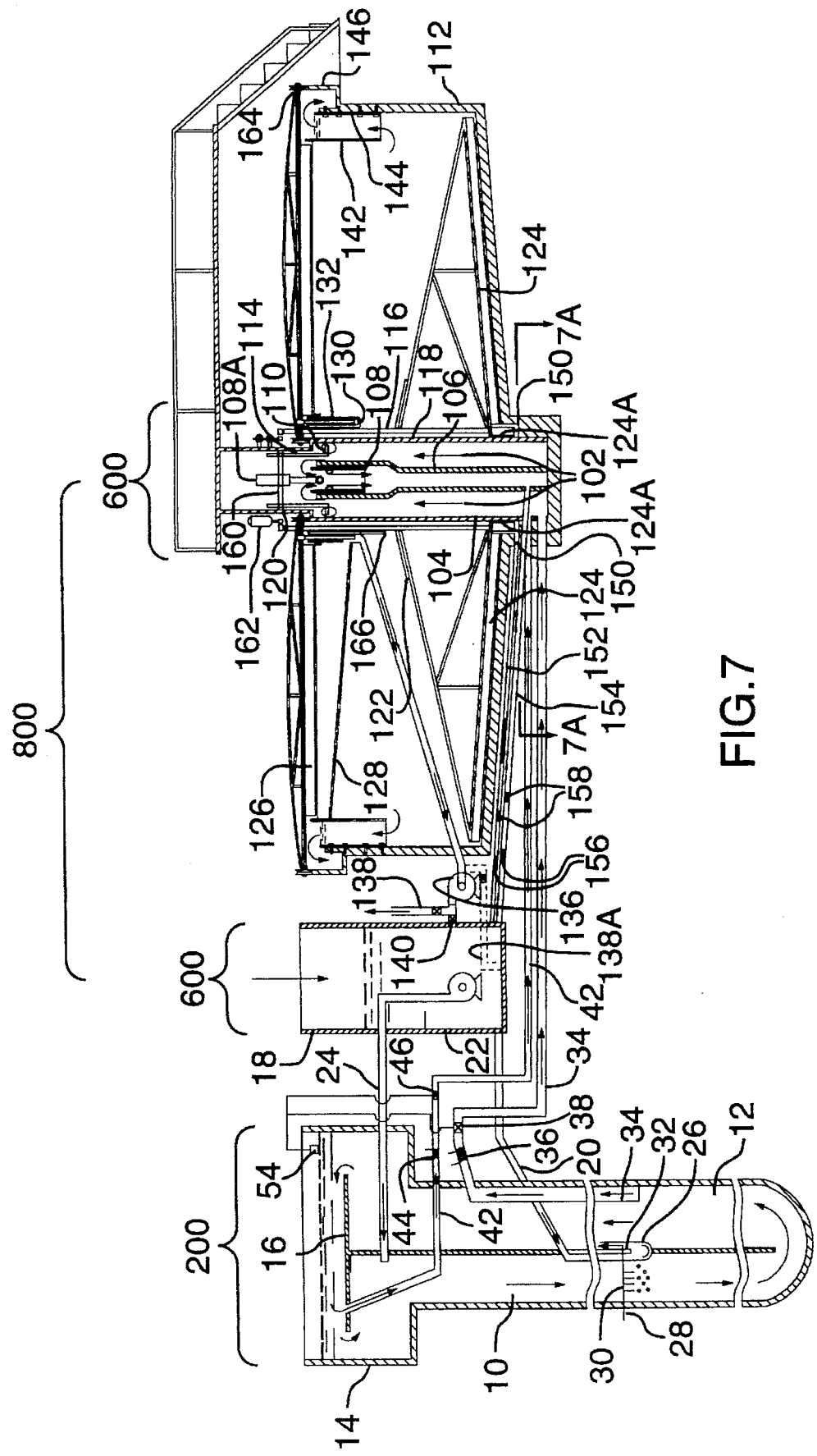
FIG. 7 is a diagrammatic vertical section through a circular flotation-sedimentation vessel, mixing chamber, and influent reservoir
Figure 7A:
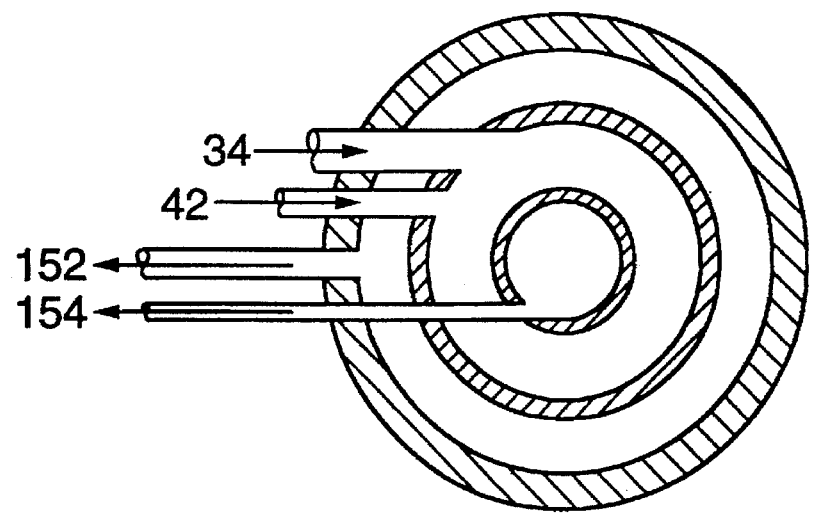
FIG. 7A is a horizontal cross-sectional view of a lower portion of the mixing chamber illustrated in FIG. 7.
Figure 7B:
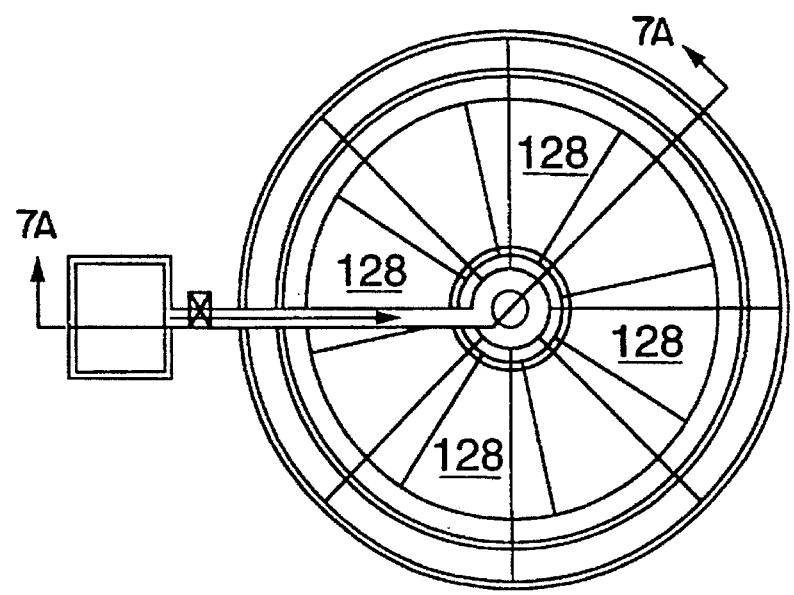
FIG. 7B is a plan view reduced in size of the circular flotation sedimentation vessel illustrated in FIG. 7.
Figure 7C:
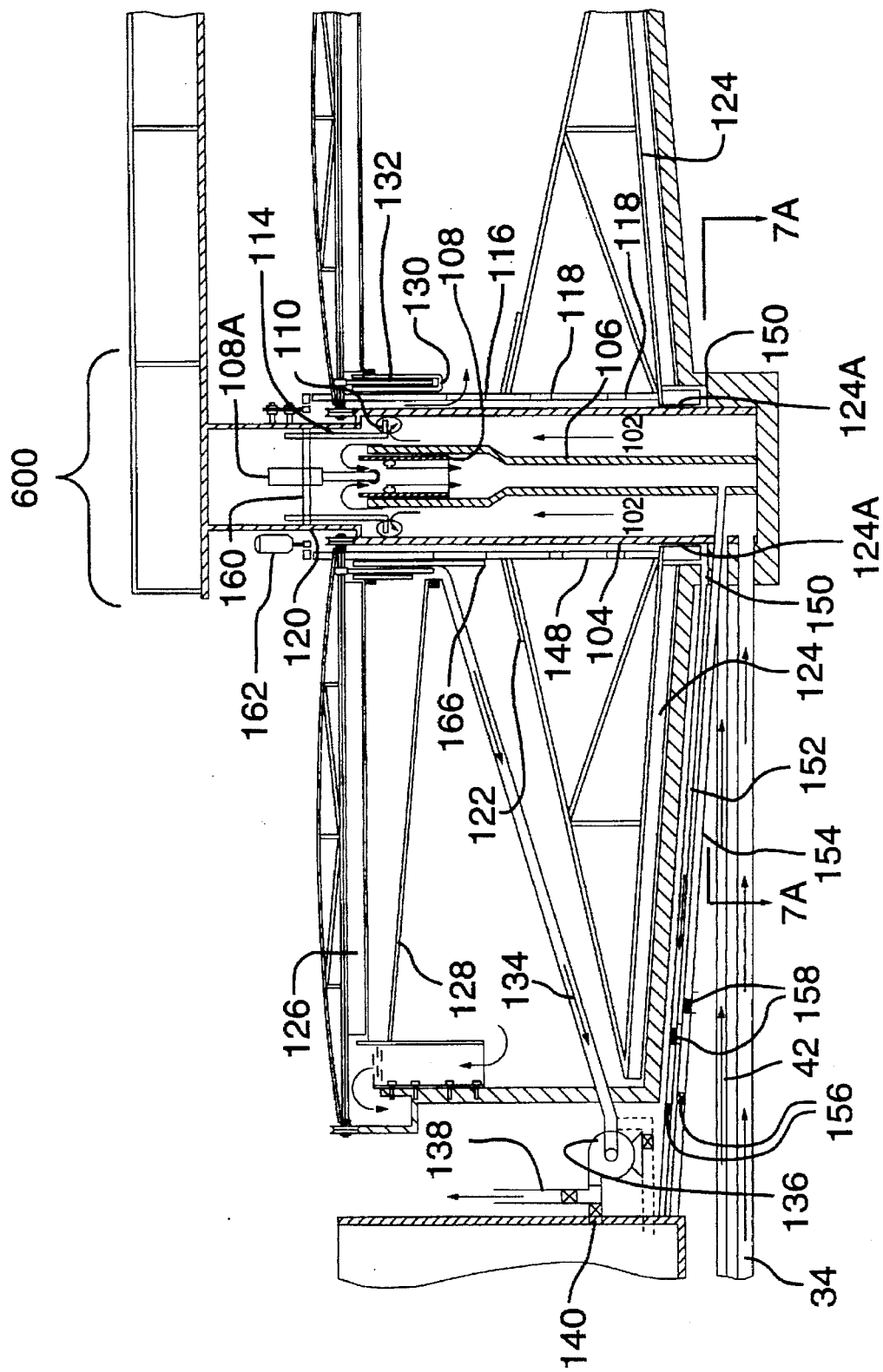
FIG. 7C is an enlargement in part of FIG. 7.

An Alternative Preferred Embodiment of the Invention wherein Solids/Liquid System 400 is Replaced with an Alternative System shown Generally as 800 in FIG. 7 is now Described With reference to FIGS. 1–3 and FIG. 7 and 7C, flotation-sedimentation system 400 of the prior art shown in FIG. 1 is replaced by alternate flotation-sedimentation system 800 as shown in FIG. 7, FIGS. 7A, 7B, and 7C.

With reference now only to FIG. 7, waste influent is introduced into the system and subsequently riser chamber 12 through reservoir 18 which discharges into waste influent conduit 20 and, under certain conditions of high flow, also by pump 22 into conduit 24. Effluent passes from conduit 34 through flow meter 36 and flow control valve 38 to a circular flocculation and gas micro-bubble generation mixing chamber 102, consisting of an outside wall formed by fixed center column 104 and inside wall formed by fixed return standpipe 106. Effluent is also drawn through surface conduit 42 from basin 14 at a point upstream of the inlet of conduit 24 and passes through flow meter 44 and flow control valve 46 to chamber 102.

Mixed liquor fed into mixing chamber 102 from surface conduit 42 containing substantially dispersed gas effects heterogeneous bubble nucleation of the dissolved gas in the mixed liquor fed from waste effluent conduit 34 into mixing chamber 102. Thus, intimate admixture of these two mixed liquors in mixing chamber 102 causes the unexpected generation of a greater volume of gas in the form of bubbles to assist in beneficial flocculation and flotation process.

Chamber 102 is fitted with moveable overflow control weir 108 which is controlled by linear actuator 108A and fixed feed ports 110 operatively connected to a circular flotation/sedimentation vessel 112. Flow control valves 46 and 38 are adjustable in order to provide an optimum proportioning of effluent flows from surface conduit 42 and waste effluent conduit 34. Together valves 38 and 46 are controlled electronically by liquid level indicators in basin 14 or by mechanical means operated by float 54. Flow meters 44 and 36 provide a means of measuring flow in conduit 42 and 34, respectively. Thus valves 38 and 46 and flow meters 44 and 36 comprise mixing means. The hydraulic residence time in chamber 102 is controlled by regulating the flow rate out through feed ports 110 and overflow rate of weir 108. Polymer feed lines 114 provides a means for injecting flocculating chemicals or pH adjustment. Pressurized air supply conduit 28 also connects with feed lines 114 whereby periodic operation through feed lines of high pressure air prevents solids build up in feed ports 110.

Thus, the relative amounts and velocity gradients of the respective mixed liquors fed from conduits 34 and 42 may be readily suitably controlled to effect optimization of heterogeneous bubble nucleation.

Mixed liquor enters vessel 112 from mixing chamber 102 through fixed feed ports 110, rotating ports 116, and supplementary rotating ports 118. Dispersed gas bubbles will migrate upward and out through orifice 120 to atmosphere. As the liquor flows through rotating ports 116, circumferentially continuous deflector plate 122 assists in directing the flow to the vessel interior. The tube struts and scraper supports of bottom scrapers 124 assist in stirring the effluent as it enters the vessel and aid in the dissolution of residual dissolved gas. The majority of small gas bubbles coming out of solution and contained in the admixed denucleated liquor follow the hydraulic flow to the interior section of vessel 112 where they act to float floc to the surface. Typically, floating solids are skimmed off of the surface of the liquid by one of five top scrapers 126 into one of four sludge hoppers 128, positioned at 90° intervals around the vessel. The sludge then flows from the hopper to the circumferentially continuous hopper 'U' trough 130, where it is scraped by sludge hopper paddle 132 around to the sludge hopper that is in communication with the thickened sludge discharge conduit 134, in which line the sludge is moved by pump 136 to either the waste sludge off-line 138 or recycled to reservoir 18 via valve 140. Effluent free from sludge passes under vertical baffle 142 and over weir plate 144 to effluent trough 146. From trough 146 the treated effluent, free from solids, may be discharged into natural water courses.

As the admixed and denucleated effluent stream leaves the mixing chamber 102 and feed ports 110, it is directed downwards by ported torque tube 148, while dispersed gas bubbles will migrate up and out through orifice 120 to atmosphere. The stream enters flotation-sedimentation vessel 112 via rotating ports 116 and 118 and deflector plate 122. Solids falling to the bottom of vessel 112 are channeled into bottom sludge recycle trough 150 by bottom scrapers 124 and scraped around torque tube 148 by bottom paddles 124A to bottom recycle line 152 where it is then driven by the head pressure of vessel 112 through bottom recycle line 152 to reservoir 18. Mixed liquor overflowing adjustable control weir 108 down-flows through fixed return standpipe 106 to top recycle line 154 and into reservoir 18. Flow control valves 156 and flow meters 158 are fitted to the recycle lines 152 and 154.

The top and bottom scrapers and support struts are rotated around the fixed center hub 160 by the ported torque tube 148 which in turn is powered by scraper drive 162. Adjustable control weir 108 is controlled by linear actuator 108A. The top scrapers are supported at their radial ends by wheels 164 which roll on the outside wall of effluent trough 146, while bottom scrapers are cantilever suspended from torque tube 148.

The rotating ports 116 on the ported torque tube 148 are opened for effluent migration from mixing chamber 102 via ports 110 to vessel 112 interior only at the regions occurring between the sludge hoppers 128. This is achieved by a stationary extended apron 166 on the hopper 'U' trough 130 situated only at the locations where the hopper abuts the 'U' trough.

As port 116 rotates past hopper 128, the stationary extended apron 166 closes off the port for only the width of the hopper. This will prevent liquor discharge at the hopper sites, which may cause unwanted bio-flocculant build-up on the underside of the hopper floors.

In operation, recycle lines 152 and 154 in combination with reservoir 18 functions to control the waste water influent flow to bioreactor 200. As the flow of influent waste water to reservoir 18 increases, the head of liquid in reservoir 18 rises, increasing the back pressure against the flow from recycle lines 152 and 154 and increasing the inlet pressure of conduit 20. Thus, flow of recycle liquor from flotation/sedimentation vessel 112 to reservoir 18 is reduced while the flow to waste influent conduit 20 is increased. Similarly, a reduction in flow of influent waste to reservoir 18 results in an increase in recycle flow through lines 152 and 154 and a decrease inflow to waste influent conduit 20. In cases of extreme hydraulic flows it is more economic to operate pump 22 to augment influent flow through conduit 24 into the bioreactor and maintain correct levels in reservoir 18. Optionally, grit clean-out line 138A may be installed at the floor of reservoir 18 and connected to waste sludge off-line 138 to remove settled grit delivered from the bottom recycle line 152.

Effluent from chamber 102 passes through feed ports 110 into flotation/sedimentation vessel 112 into a gentle mixing zone. Mixing is assisted by the motion of tube struts and scraper supports of scrapers 124. Dispersed gas bubbles entering from feed ports 110 leave by orifice 120.

While not being bound by theory, it is believed that a recycling of mixed liquor entering flotation/sedimentation vessel 112 takes place following a path across deflector plate 122 and out toward the central regions of vessel 112 following in general the circular path of the bottom scrapers 124. This circulation tends to fractionate the dispersed gas bubbles according to bubble size. As noted hereinbefore large gas bubbles rise immediately and are ejected through the top orifice 120. Smaller bubbles tend to pass across deflector plate 122 and float to the surface in vessel 112. Minute bubbles tend to follow the liquid flow and circulate around the vessel. The recycle directions affects the operation of flotation/sedimentation vessel 112. It reduces the fraction of dispersed gas bubbles in the mixed liquor in the influent zone of vessel 112 since the recycle stream has a lower fraction of dispersed bubbles than the effluent entering vessel 112. The recycle of sedimented sludge and accompanying liquid by rotating bottom scraper paddles 124A from the bottom of flotation/sedimentation vessel 112 to reservoir 18 serves to control the flow of influent to the bioreactor. If the influent waste flow to reservoir 18 increases, the height of liquid in reservoir 18 increases causing increased back pressure against the recycle from the bottom of flotation/sedimentation vessel 112. In the alternate preferred embodiment shown, chamber 102 is constructed so as to provide a hydraulic residence time of 1 to 4 minutes and the stilling zone in the flotation/sedimentation vessel 112 is typically two to three times greater than the residence time in chamber 102, with the stilling zone being that region of the flotation vessel wherein energy levels are low enough for flotation to occur.

Figure 8A:
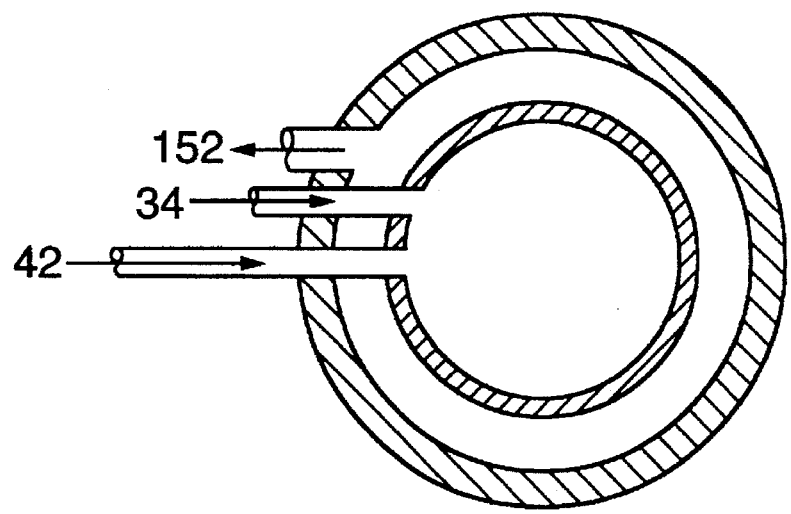
FIG. 8A is a horizontal cross-section view of a lower portion of the mixing chamber illustrated in FIG. 8.
Figure 8B:
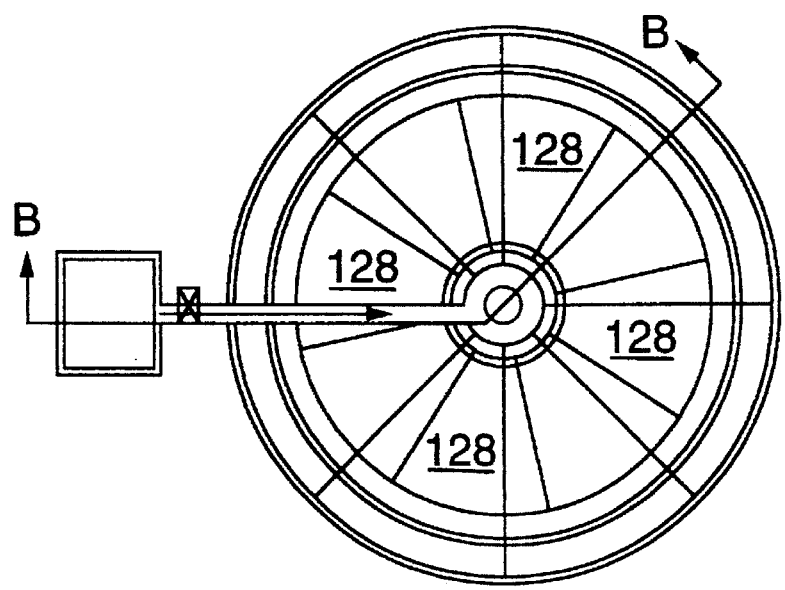
FIG. 8B is a plan view reduced in size of the circular flotation-sedimentation vessel of FIG. 8.

FIGS. 8, 8A, and 8B show a further alternative embodiment not having a distinct mixing chamber 102 as present in the embodiment shown in FIG. 7. Conduits 34 and 42 feed directly to vessel 112 such that intimate contact between the respective liquor fed by conduit 42 effects nucleation of the dissolved gas of the liquid fed by conduit 34 to assist the flocculation and flotation process. Thus, conduits 34 and 42 have respective outlets to vessel 112 that are preferably so disposed, one outlet relative to the other, preferably, adjacent, as to effect intimate mixing of the respective liquors.

Figure 4:
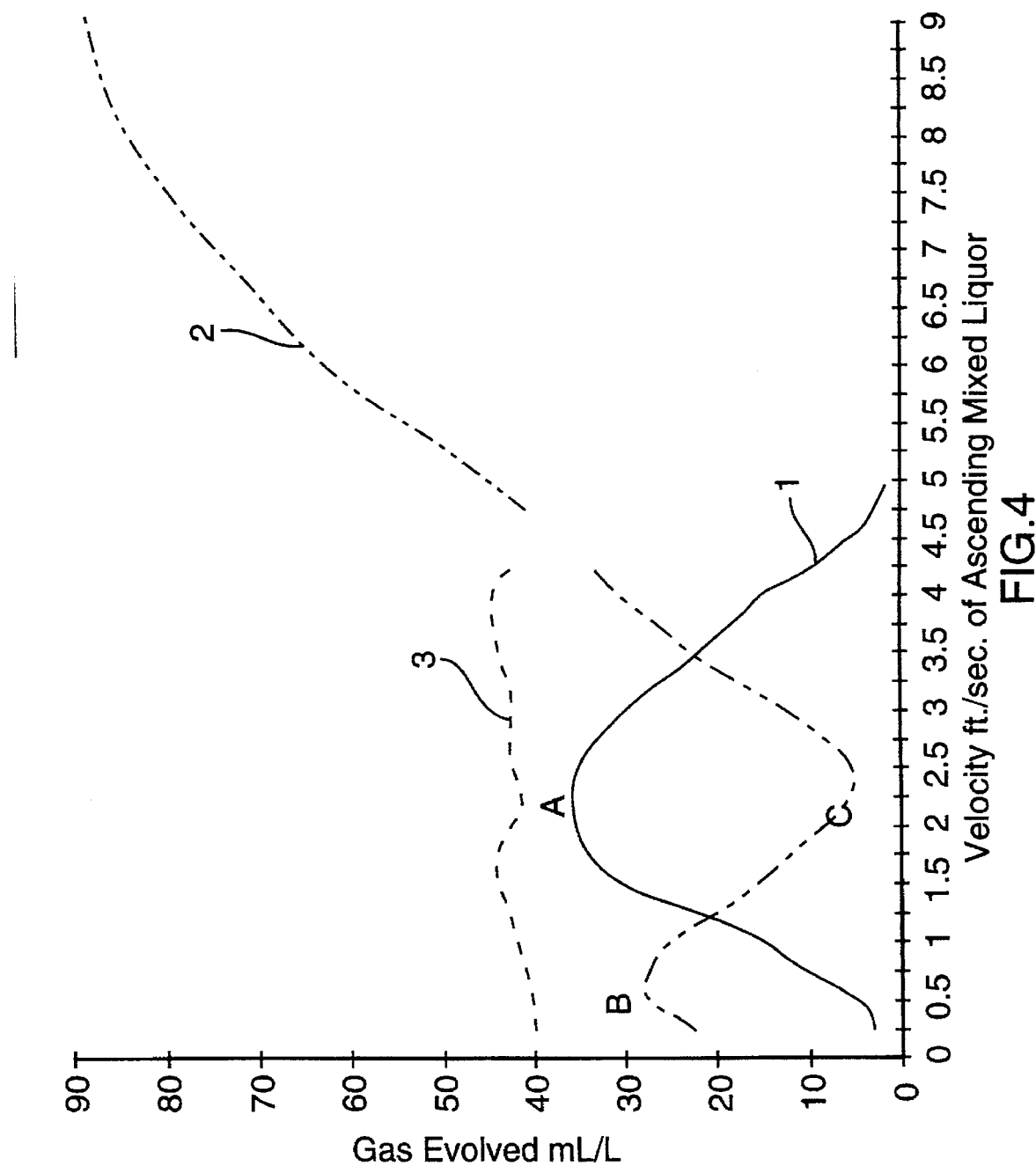
FIG. 4 is a plot of the volume and type of gas evolved from mixed liquor in a long vertical bioreactor of use in the present invention with respect to the rate of ascension from depth.

FIG. 4 is a graphical representation of data obtained with the Dissolved/Dispersed test rig as herein after explained and illustrated with reference to FIG. 6. Line #1 represents dispersed gas evolved, Line #2 represents dissolved gas evolved, and line #3 represents total gas evolved. Zone B represents dissolved gas evolved at riser velocities of 0.5–1.5 ft./sec. Zone A represents dispersed gas evolved at riser velocities of 1.5–2.5 ft./sec. Zone C represents dissolved gas evolved at riser velocities of 2.5–3.0 ft./sec. Measurements were made at several plant sites where full scale 500' deep bioreactors were operating. Typically, full scale bioreactors operate economically on air lift circulation at riser velocities of 2.5 to 3.5 ft./sec. For this experiment one of the smaller plants was modified using a mechanical pump to provide circulation at various riser fluid velocities of 0.25 ft./sec. to 9 ft./sec.

It is known that dispersed gas bubbles in the bioreactor rise at about 1 ft./sec. in the liquid media, whereas dissolved gas and colloidal gas bubbles travel at essentially the same velocity as the liquid media. Without being bound by theory the data in FIG. 4 suggests that at very low riser velocities, the dispersed bubbles are traveling upward at differential velocities of about one ft./sec. faster than the velocity of the bulk liquid. This may result in insufficient mixing energy to initiate bubble nucleation of the dissolved gas in the bulk liquid. In addition, the bulk liquid in the riser is also in a laminar flow condition at the low riser velocities. It is believed that Zone B on the graph in FIG. 4 illustrates that the relatively high level of dissolved gas is primarily due to the low mixing energy and laminar flow experienced at riser velocity of 0.5 ft./sec. to 1.5 ft./sec. From 1.5 to 2.5 ft./sec. the fluid in the riser is entering turbulent flow regime and the dispersed gas bubbles will be well mixed in the bulk liquid. Surprisingly, this level of mixing energy is sufficient to prevent large bubbles from forming but is low enough to prevent a lot of bubble shear and re-solubilization.

Zone A indicates that a sample taken at the top of the riser will contain a high percentage of dispersed gas (that is bubbles small enough to be carried in the bulk liquid but big enough to spontaneously come out of solution within one minute). This flow velocity and/or turbulence level has sufficient energy to substantially remove the dissolved gas fraction from the bulk fluid. This riser velocity of 2.5 to 3 ft./sec. is also noted as the most energy efficient velocity for shaft bioreactor operation as virtually all the air injected into the shaft exists as small bubbles, at least in the riser. This minimizes the bulk density of the riser fluid and as a result maximizing the air lift effect. It should be noted that Zone C shows a minimum of dissolved gas which may be apparently due to the nucleation of dissolved gas on dispersed gas bubbles.

Continuing this reasoning further, to 5 ft./sec. and greater, it is believed that the energy level is sufficient to shear gas bubbles as they form and limit the production of dispersed gas. Since these bubbles are quite small they travel at the velocity of the bulk liquid and there is presumably little bubble interaction and mixing of the tiny gas bubbles with the bulk fluid at velocities higher than 5 ft./sec. Another explanation for this lack of dispersed gas at higher velocities may be that there is enough energy above 5 ft./sec. to shear and re-solubilize any dispersed gas bubbles that form.

In order to verify that dispersed gas exists only in limited quantities at velocities higher than 5 ft./sec., a Dissolved Oxygen probe was used which only measures Dissolved Oxygen in the bulk liquid. I found that the dissolved air values, calculated by the Dissolved Oxygen probe method, coincided with the values obtained by the Dissolved/Dispersed air test rig. Whether or not this interpretation of the observed data is correct may be open to question. However, I have found that this hypothesis can be used with a high degree of confidence to predict results on full scale operating plants.

One significant observation from FIG. 4 is that when the riser chamber of a bioreactor is operating at peak efficiency for air lift (2.5–3.0 ft./sec.), the air bubbles available to effect flotation are almost all in the form of dispersed gas which, by definition, will spontaneously leave the bulk liquid in less than one minute. This is far too short a time to flocculate the biomass or even transfer liquor from the bioreactor to the solids liquid separator.

Since the flow to the solids/liquids separator is generally less than 10% of the fluid flow in the riser of the bioreactor, it is economically feasible to operate the effluent channel at much higher velocities than the bioreactor riser without incurring a significant penalty in the overall bioreactor energy. In addition, generally it is preferable to mix at least ⅓ to ½ volume of effluent from the top of the bioreactor riser with the flow from the effluent channel thereby further reducing the flow required in the high velocity channel to 6.7% of the total flow in both risers.

An advantage of utilizing high effluent channel velocities is that large quantities of dissolved gas are available to effect solids separation by flotation, provided that this dissolved gas can be released at the appropriate location and at energy levels low enough to allow bio-flocculation. This invention achieves these requirements by mixing a continuous supply of dispersed gas bubbles from the top of the bioreactor (Zone A) with a continuous, but much larger quantity of dissolved gas from the high velocity effluent line in such a way that substantially all the gas is liberated from the solution just prior to, or within the flotation/sedimentation vessel.

Figure 5:
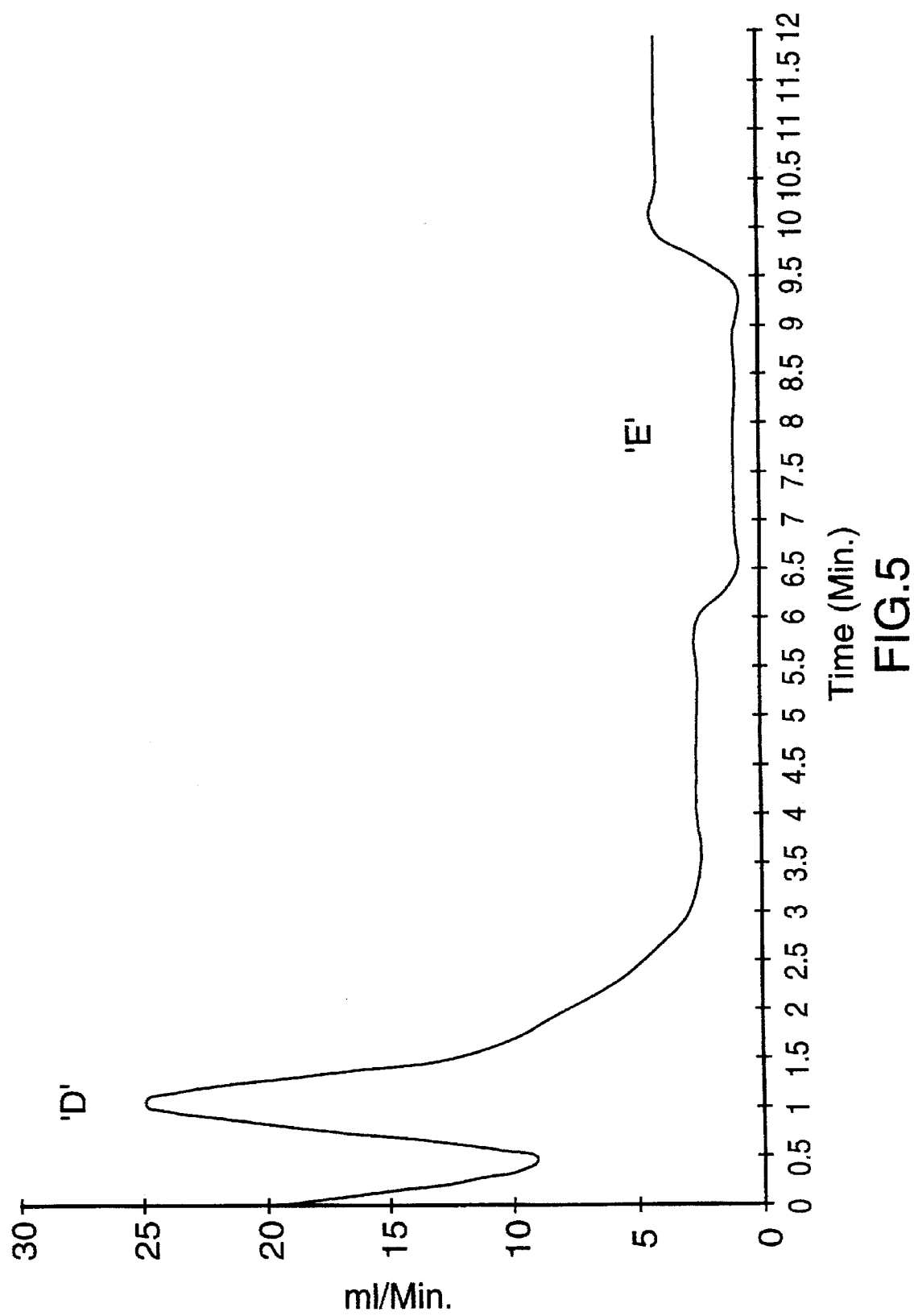
FIG. 5 is a plot of rate of gas evolution with respect to time from a supersaturated sample of mixed liquor obtained from practice of the method according to the present invention.

Reference is now made to FIG. 5, which plots the rate of gas evolution from a supersaturated solution of mixed liquor taken from a bioreactor. The apparatus is similar to the Dissolved/Dispersed air test rig as hereinafter described but wherein the vessel is designed to withstand 30 psi of pressure and is fitted with a miniature recording flowmeter. Zone D represents the rate of gas evolution in the first minute after release of pressure. Zone E presents the rate of gas evolution between 6.5 and 10 minutes after release of pressure.

The relationship of FIG. 4 to FIG. 5 can be derived by integrating the area under the curve of FIG. 5 between time=0 minutes and time=6.5 minutes to get the total gas evolved per litre of the sample. Unfortunately, the apparatus used to generate data for FIG. 5 does not distinguish between dissolved and dispersed gas. In general, approximately 42 mi of gas per litre of mixed liquor will evolve in about 6.5 minutes at 30 psi starting pressure. This value is quite similar to the 40–42 mill of total gas collected and recorded in FIG. 4 for mixed liquors taken from a bioreactor operating at less than 4.5 ft./sec.

FIG. 5. shows that in the first minute after release of pressure (Zone D) about ⅓ of the total available gas (15 ml) comes out of solution (This is arbitrarily labeled dispersed gas as shown in FIG. 4). From the 1 minute mark to the 6 minute mark there is a fairly typical decay curve which at first glance indicates the rate of gas production is proportional to the remaining gas. This conforms to the classic theory regarding first order decay rates. At about 6.5 minutes (Zone E), gas production virtually stops but when ultrasonic are switched on at the 10 minute mark, gas production resumes at a rate equivalent to the gas production at the two minute mark.

The significance of FIG. 5 is that gas production is more likely to be proportional to the concentration of dispersed gas bubbles and not the concentration of dissolved gas. Stated another way, the rate of gas production is proportional to the amount of gas already out of solution i.e. dispersed gas, and is not proportional to the concentration of gas remaining in solution i.e. dissolved gas, as classical theory suggests. Referring again to FIG. 4, the right end of the graph clearly shows that very high dissolved gas levels are achievable in the absence of dispersed gas but by contrast, at Zone C, when sufficient dispersed gas bubbles are present, dissolved gas concentration is low.

Figure 6A:
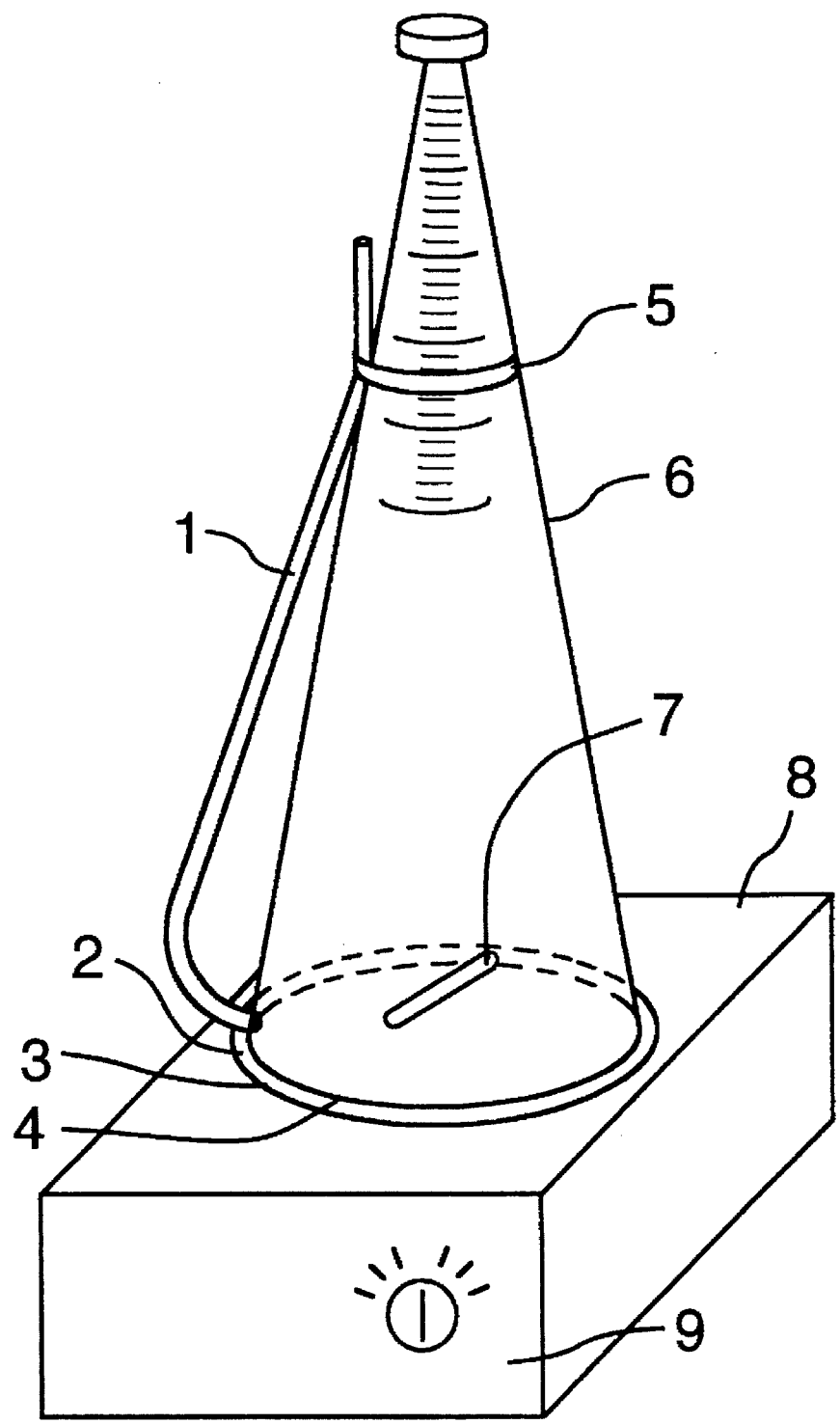
FIG. 6 is a diagrammatic sketch of a test apparatus used to measure dissolved and dispersed air and gas flow in the practice of the present invention.
Figure 6B:
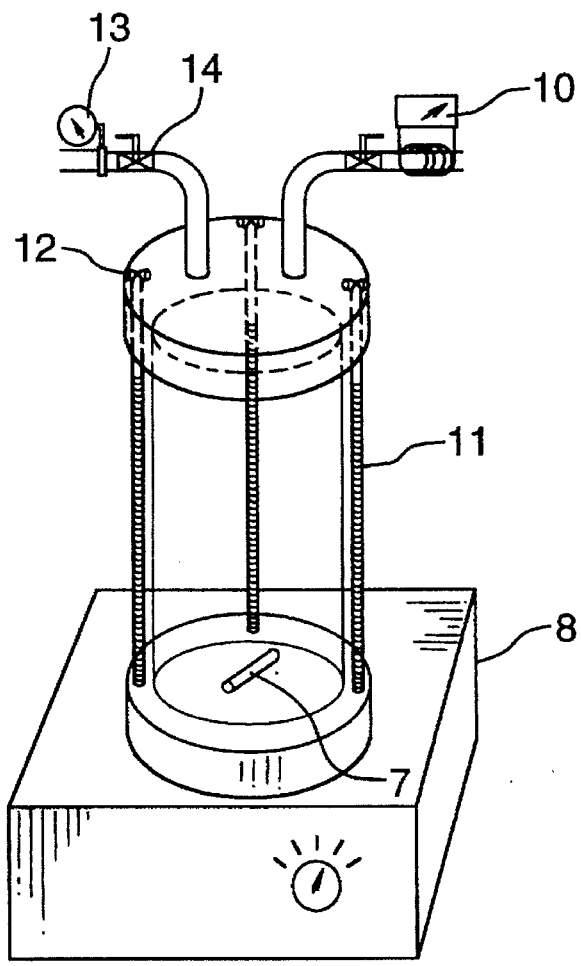
Figure 6C:
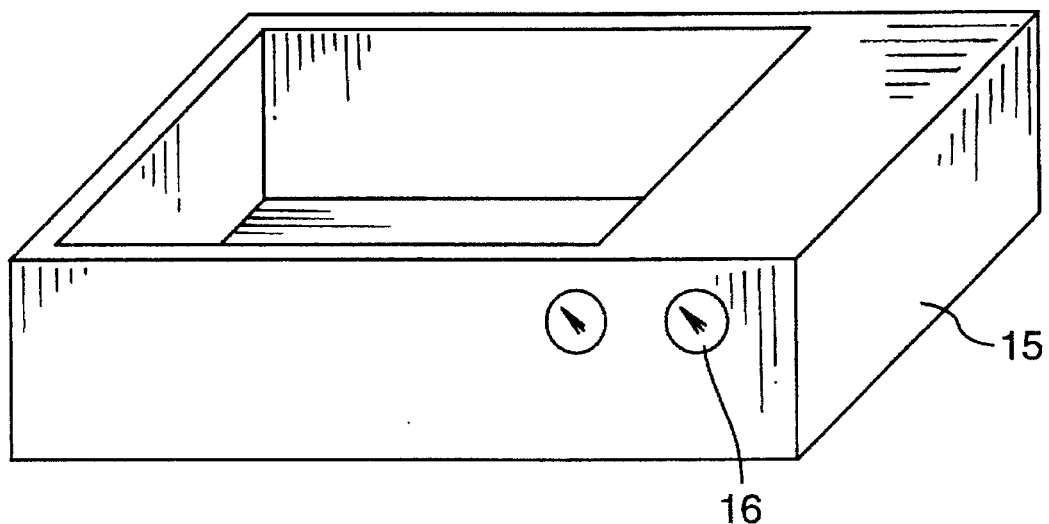

Reference is now made to FIG. 6 which illustrates the gas flow and measurement devices that were used in the foregoing experiments wherein FIG. 6A illustrates the apparatus used for the measurement of dissolved and dispersed gas, conducted as follows; FIG. 6B illustrates the apparatus for the measurement of the rate of gas production and FIG. 6C is a Mettler 200 Watt Ultrasonic Bath Cleaner.

A plastic Imhoff cone is inverted on a plastic disk. A magnetic stirrer is placed on the disk and the apparatus is set on a magnetic stirrer base. A ¼" diameter hole is drilled near the big end of the cone and a flexible tube is glued into the hole. The flex tube is held to the cone wall with an elastic band. For very special tests, the rig can be placed in a lab sized ultrasonic bath cleaner (Mettler 200 watt) instead of on the magnetic stirrer. The ultrasonic energy will generate gas even after 10 minutes of stirring and the ultimate gas quantities can be determined by this method. Note that ultrasonic can be used for only a few minutes in order to avoid heat build up changing solubility of gas in water.

A number of pieces are standard purchased lab items, and are listed below.

1. Thin wall rubber tubing, approximately ¼" I.D.
2. Drilled vent hole with attached rubber tubing.
3. A plastic cover from a coffee can.
4. Grease smear.
5. Heavy elastic band to secure rubber tube.
6. A one litre clear plastic Imhoff cone graduated in ml.
7. A magnetic stir bar.
8. A magnetic stirrer motor.
9. Variable speed stir rate.
10. Miniature flow meter with flow recorder.
11. Fabricated clear plastic one litre cylinder with heavy aluminum end plates held together with quick release tie rods.
12. Wing nuts.
13. Air pressure gauge.
14. Shut off valve.
15. Mettler 200 Watt ultrasonic bath.
16. Variable input ultrasonic generator.

The operation of the cone shaped device is conducted as follows:

Holding thumb pressure on the rubber hose, and keeping the big end of the cone up, the cone is rapidly filled to overflowing using an appropriate sample port located on the bioreactor. As quickly as possible a stir bar is dropped into the cone and the lid is placed over the large end. The cone is turned, big end down, and placed on the magnetic stirrer. A timing clock is started at time 0 and the rubber tube is adjusted to keep the liquid level in the tube equal to the liquid level in the cone. This insures that head space gas is neither under pressure or vacuum. After 1 minute, the volume of gas collected in the tip of the cone is read and this volume is called dispersed gas.

The magnetic stirrer is started and the liquid volume of the cone is stirred at a speed setting which allows bio-flocculation of the mixed liquor in the cone to proceed. Stirring continues until the gas collected in the tip of the cone appears to be at a final volume. This usually takes five to six minutes. The difference between the first volume of dispersed gas read and the final volume is called dissolved gas.

After 10 minutes the cone is removed from the magnetic base and placed in the ultrasonic bath cleaner. The ultrasonic unit is switched on at an energy level that beings to generate gas in the top of the cone. A third volume of gas can be read after about 12 minutes, but care must be taken not to continue with ultrasonic energy for long periods since heat build-up distorts the results.

The operation of the cylindrical device is as follows:

The top of the pressure cylinder is removed by releasing the quick release tie bars using the wing nuts. Mixed liquor is poured into the cylinder leaving a small amount of free board at the top. The magnetic stir bar is placed in the cylinder and the top secured.

Air pressure at about 30 psi is applied to the cylinder while being agitated. Complete saturation should be achieved in 5 to 10 minutes. The air pressure is released and the air valve closed. The valve to the recording flow meter is opened. After one minute the stirrer is started at a speed which allows bio-flocculation to proceed. The gas flow rate will appear to have stopped after about six to seven minutes. After 10 minutes the cylinder is placed in the ultrasonic bath and the ultrasonic unit is switched on. Gas flow will resume and be recorded on the flow meter. A typical print out of gas flow is given in FIG. 5.

EXAMPLE 1

A test apparatus was constructed to measure dissolved and dispersed gas fractions in a supersaturated mixed liquor sample drawn from an operating long vertical shaft bioreactor. Samples were taken from the top of a riser chamber and from the top of a treated effluent conduit of an operating 500' deep vertical bioreactor. The conditions of load, temperature, mixed liquor concentration, aeration rate and pH, were held as constant as possible in order to eliminate some of the variables.

Initially the fluid flow in the riser chamber was increased from 0.25 ft./sec. to 4.5 ft./sec. by increasing internal recycle and a test rig was used to measure dispersed and dissolved gas levels. Above 4.5 ft./sec. dissolved gas content was calculated from dissolved oxygen measurements when the bioreactor was operating under "no load". This measurement technique was corrected to be consistent with dissolved air values obtained below 4 ½ ft./sec. The disadvantage of the dissolved oxygen method is that it only measures dissolved gas indirectly and cannot measure dispersed gas.

The results of the tests are shown in FIG. 4 and indicate the following:
1. There is a desired minimum energy level required to initiate dispersed gas precipitation.
2. Dispersed gas precipitation appears to be a maximum at the onset of turbulent flow.
3. The range of velocities where dispersed gas is relatively high (1.0–3.5 ft./sec.) coincides with the visual observation of good flocculation of the biomass.
4. The best flotation performance observed in full scale bioreactors occurs when dispersed and dissolved gas are about equal and operated at 1.5 ft./sec. and 3.5 ft./sec.
5. Dispersed gas is a maximum when dissolved gas is a minimum and vice versa.
6. Total gas evolved is fairly constant indicating other variables influencing gas precipitation were held reasonably constant in this experiment.
7. Dissolved gas levels can increase significantly in the absence of dispersed gas bubbles even at higher energy levels.
8. Dissolved gas can increase significantly when energy levels are too high for good flocculation.

EXAMPLE 2

In a laboratory apparatus, mixed liquor samples were subjected to aeration in a vessel under pressure of 10 to 30 psi. The aeration was stopped and the rate of gas evolution measured with a miniature flow meter. The data is plotted in FIG. 5.

When pressure is released from a sample aerated at 30 psi there is an immediate but decreasing "head space" gas release for about 15 seconds. There is then an increase of gas flow up to about one minute as dispersed gas spontaneously nucleates and comes out of solution. Visually, flocculation can be observed beginning at the end of one minute as dispersed gas production decreases. Gas production continues for about six minutes and abruptly decreases when the dispersed gas bubbles stop forming. From six to ten minutes very little gas is seen to evolve although a small gas flow is recorded. At the ten minute mark, low level ultrasonic energy is introduced and gas flow resumes at the level of the two minute mark when the energy was being supplied by dispersed gas.

Ultrasonic energy was used to reinitiate dissolved gas precipitation because the use of dispersed gas for this purpose would have produced inflated gas flow measurements which are difficult to correct for.

EXAMPLE 3

In large installations utilizing the 500 foot deep bioreactor it is not unusual to measure supersaturated levels of oxygen, using a dissolved oxygen probe, at the outlet end of the flotation tank. Since oxygen is the consumable reacting gas in the bioreactor, its presence in supersaturated quantities implies the other gasses, nitrogen and carbon dioxide, are likely present in supersaturated quantities as well.

Under these conditions it is possible to remove a sample of settled biomass through a sampling port in the bottom of the recycle conduit of the flotation/sedimentation vessel and reinitiate gas precipitation and flotation of the biomass. In this case the energy required to cause bubble nucleation and flotation is thought to be the shearing action of the small valve in the sample port. Likewise in the operation of large size vertical bioreactors, improved flotation performance can be achieved if the shut off valve in the feed conduit to the flotation/sedimentation vessel is partially closed. It is believed that the restriction offered by the valve causes an increase in dispersed gas evolution rate and possibly an increase in dissolved gas precipitation. Likewise in the operation of large vertical bioreactors excessive use of air lift in the riser can cause essentially complete gas stripping of dissolved gas resulting in poor flotation performance. It is believed that the energy levels under these conditions nucleates and precipitates the dissolved gas prematurely and additionally these energy levels are far in excess of levels required for good flocculation. Likewise in the operation of a large vertical bioreactor where circulation is provided by mechanical pumping, the minimum use of air in the riser can cause serious pH depression due to $CO_2$ build up. It is thought that in the absence of sufficient quantities of dispersed gas, provided by the riser air, large quantities of dissolved gas including $CO_2$ remain in solution despite the presence of a large number of nucleating sites provided by the biomass solid particles.

EXAMPLE 4

In a major operating shaft of 8 MGD, treated effluent, containing high levels of dissolved gas, flow from the deep shaft to a secondary aeration tank to undergo aeration and agitation from upward flowing course bubbles (dispersed gas). This has the effect of stripping the effluent of dissolved gas, go that it may then flow to clarifiers for subsequent settling and removal of sludge solids.

It is to be understood that modifications to the embodiments of the invention described and illustrated herein can be made without departing from the scope and spirit of the invention as defined in the appended claims.

I claim:

1. A process for effecting heterogeneous bubble nucleation in a waste mixed liquor of a bioreactor treatment system having:
   a) a deep vertical bioreactor having an upper zone and a lower zone;
   b) a solids flotation/separation vessel;
   c) a source of first mixed liquor from said lower zone of said bioreactor; and
   d) a source of second mixed liquor from said upper zone of said bioreactor; said process comprising admixing said first liquor with said second liquor to effect said nucleation to provide an admixed substantially denucleated effluent liquor.

2. A process as defined in claim 1 wherein said first liquor is admixed with said second liquor in said solids/flotation vessel.

3. A process as defined in claim 1 comprising admixing said first liquor and said second liquor in a bubble generation chamber in communication with said solids flotation/separation vessel and feeding said admixed and denucleated effluent stream to said solids flotation/separation vessel.

4. A process as defined in claim 1 wherein said first liquor contains a predominance of dissolved gas and said second liquor contains a predominance of dispersed gas.

5. A process as defined in claim 1 wherein said bioreactor upper zone comprises a surface vessel as said source of said second liquor.

6. A process as defined in claim 1 wherein said first liquor and said second liquor are provided at different velocities and energy levels to effect said nucleation.

7. A process as defined in claim 6 wherein said energy levels are below 200 $sec^{-1}$.

8. A process as defined in claim 7 wherein said energy levels are between 100–200 $sec^{-1}$.

9. A process as defined in claim 1 wherein said second liquor has a velocity of about 2.5–3.5 ft./sec. and is mixed with said first liquor in a ratio selected from about 1:2 to 1:3 to total volume.

10. An improved apparatus for treating waste mixed liquor comprising a long vertical downcomer chamber; an adjacent long vertical riser chamber; a surface basin; said downcomer chamber and said riser chamber operatively communicating directly with each other at their lower ends and through said basin at their upper ends to form a circulatory loop; means for injecting an oxygen-containing gas in said downcomer and riser chambers at depth; a flotation-sedimentation vessel adjacent said surface basin; a first waste liquor influent conduit opening into said riser chamber at depth and operatively communicating with said vessel to provide a first waste liquor influent from said vessel to said riser chamber; a treated liquor effluent first conduit opening into said riser chamber at depth and operatively in communication with said vessel to provide a treated waste liquor first effluent to said vessel from said riser chamber; the improvement comprising a treated waste liquor effluent second conduit having an inlet opening into said surface basin and operatively in communication with said vessel to provide a treated waste liquor second effluent to said vessel from said surface basin, and flow control and mixing means to operatively provide said treated waste liquor fist and second effluents in such intimate mixing of said first and said second effluents as to cause heterogeneous bubble nucleation thereof and produce a nucleated liquor.

11. Apparatus as defined in claim 10 wherein said effluent first conduit and said effluent second conduit discharge into said flotation-sedimentation vessel.

12. Apparatus as defined in claim 10 comprising a mixing chamber operatively in communication with said flotation-sedimentation vessel, said effluent first conduit and said effluent second conduit to operatively receive said first effluent and said second effluent respectively, such that said heterogeneous nucleation essentially occurs within said mixing chamber to provide said nucleated liquor prior to discharge of said nucleated liquor to said vessel.

13. An apparatus as defined in claim 10 further comprising a reservoir located adjacent to and in communication with said vessel to receive vessel waste liquor from said vessel and in communication with said waste liquor influent first conduit to provide a first portion of said vessel waste liquor to said riser chamber.

14. An apparatus as defined in claim 13 further comprising a waste liquor influent second conduit in communication with said surface basin and with said reservoir to provide a second portion of said vessel waste liquor to said surface basin, with the influent orifice located down stream of second effluent conduit opening in said surface basin.

15. Apparatus as defined in claim 14, comprising a circular sedimentation-flotation vessel.

16. An improved apparatus for treating waste liquor comprising a long vertical downcomer chamber, an adjacent long vertical riser chamber, a surface basin, the downcomer and riser chambers operatively communicating directly with each other at their lower end and through the basin at their upper end to form a circulatory loop, the downcomer and riser chambers having means for the injection therein at depth of an oxygen-containing gas, a waste influent first conduit operatively opening into said riser chamber at a location above the location of said means for injecting oxygen containing gas into said influent conduit, a treated waste effluent first conduit operatively discharging from said riser chamber at a location below the location of the opening of said influent conduit into said riser chamber, the improvement comprising a waste influent second conduit operatively connected within said surface basin adjacent the top of said downcomer chamber, with the influent orifice located down stream of second effluent conduit orifice in said surface basin, a flotation/sedimentation vessel, a mixing chamber in communication with said waste effluent first and second conduits and said vessel, to receive first and second effluent flows through said effluent first and second conduits, respectively, flow control and metering devices on each of said first and said second effluent conduits, said first and second flow control devices operatively connected to a liquid level sensor at the liquid surface of said surface basin, an overflow weir within said mixing chamber operatively connected to said influent first and second conduits, said mixing chamber having a mixed waste effluent orifice operatively in communication with said vessel at a position below the normal surface level of liquid in said vessel, a sludge-receiving trough in contact with an upper edge of said vessel at a position above said mixed waste effluent orifice, a reservoir in communication with said mixing chamber overflow weir to receive influent and waste liquid flows therefrom.

17. Apparatus as defined in claim 16, comprising a circular sedimentation-flotation vessel.

* * * * *